(12) United States Patent
Hotta et al.

(10) Patent No.: US 7,808,570 B2
(45) Date of Patent: Oct. 5, 2010

(54) ACTIVE MATRIX SUBSTRATE FOR DISPLAY DEVICE AND ITS MANUFACTURE METHOD

(75) Inventors: Kazushige Hotta, Kawasaki (JP); Takuya Watanabe, Kawasaki (JP); Noriyuki Ohashi, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 513 days.

(21) Appl. No.: 10/985,814

(22) Filed: Nov. 10, 2004

(65) Prior Publication Data

US 2005/0237441 A1 Oct. 27, 2005

(30) Foreign Application Priority Data

Apr. 21, 2004 (JP) ............................ 2004-124973
Aug. 16, 2004 (JP) ............................ 2004-236393

(51) Int. Cl.
*G02F 1/136* (2006.01)

(52) U.S. Cl. ........................... 349/47; 349/147; 349/54

(58) Field of Classification Search ........................ None
See application file for complete search history.

(56) References Cited

U.S. PATENT DOCUMENTS

| 5,075,674 | A | * | 12/1991 | Katayama et al. ............. 345/93 |
| 5,396,084 | A | | 3/1995 | Matsumoto |
| 5,424,857 | A | * | 6/1995 | Aoki et al. .................... 349/38 |
| 6,864,134 | B1 | | 3/2005 | Satou et al. |
| 7,122,835 | B1 | | 10/2006 | Ikeda et al. |
| 2001/0046020 | A1 | * | 11/2001 | Cho ........................... 349/141 |
| 2001/0052950 | A1 | * | 12/2001 | Yamazaki et al. .............. 349/43 |
| 2003/0025127 | A1 | | 2/2003 | Yanai et al. |
| 2003/0124778 | A1 | | 7/2003 | Doi et al. |
| 2004/0206956 | A1 | | 10/2004 | Yanai et al. |
| 2005/0121673 | A1 | | 6/2005 | Satou et al. |
| 2005/0161673 | A1 | | 7/2005 | Doi et al. |
| 2006/0081946 | A1 | | 4/2006 | Yanai et al. |
| 2007/0026583 | A1 | | 2/2007 | Ikeda et al. |
| 2008/0283840 | A1 | | 11/2008 | Doi et al. |

FOREIGN PATENT DOCUMENTS

| JP | 01-134341 | 5/1989 |
| JP | 5-335573 | 12/1993 |
| JP | 07-020489 | 1/1995 |

(Continued)

*Primary Examiner*—David Nelms
*Assistant Examiner*—Lucy P Chien
(74) *Attorney, Agent, or Firm*—Greer, Burns & Crain, Ltd.

(57) ABSTRACT

An active matrix substrate has: scanning lines extending in row direction and image data lines extending in column direction, formed in display area; semiconductor islands at each cross point and in peripheral circuit area; a first gate insulating film formed on each pixel semiconductor island; a first gate made of a first wiring layer and formed on said first gate insulating film; a second gate insulating film thinner than the first gate insulating film formed on peripheral circuit semiconductor island; and a second gate electrode made of a second wiring layer and formed on the second gate insulating film, wherein the pixel transistor semiconductor island, first gate insulating film and first gate electrode constitute a pixel transistor, and the scanning line includes a lower layer made of the second wiring line and an upper layer made of the first wiring line connected to the lower layer.

38 Claims, 26 Drawing Sheets

FOREIGN PATENT DOCUMENTS

| | | |
|---|---|---|
| JP | 2000-353811 | 12/2000 |
| JP | 2003-045892 | 2/2003 |
| JP | 2003-045966 | 2/2003 |
| JP | 2003-086505 | 3/2003 |
| JP | 2003-188183 | 7/2003 |
| JP | 2003-332581 | 11/2003 |
| JP | 2004-109857 | 4/2004 |
| KR | 2002-0043324 | 6/2002 |

\* cited by examiner

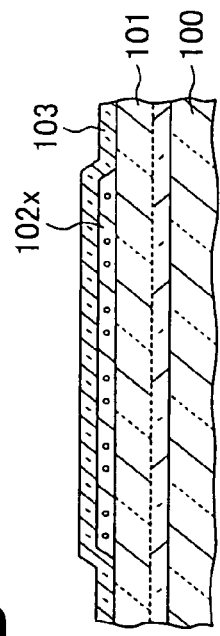
FIG.10A
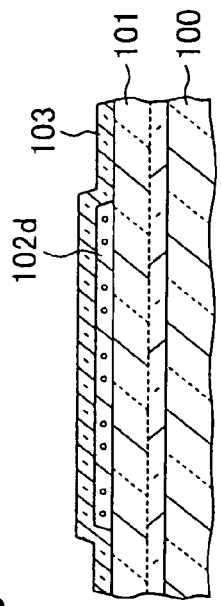
FIG.10B
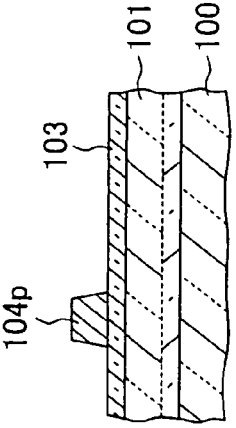
FIG.10F
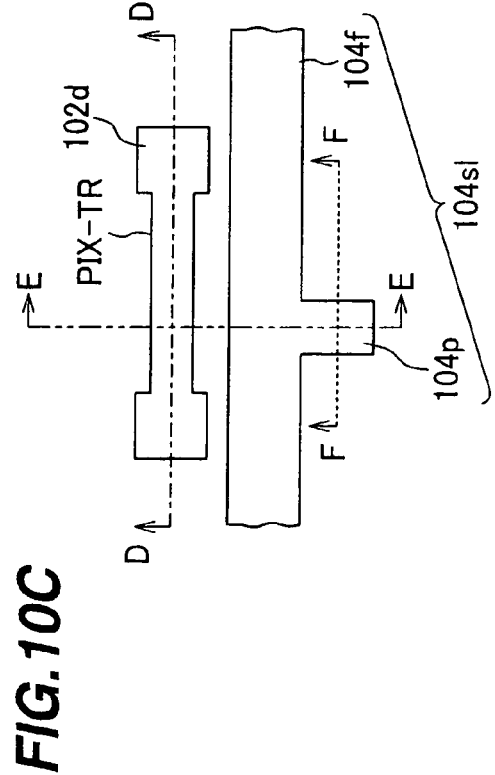
FIG.10C
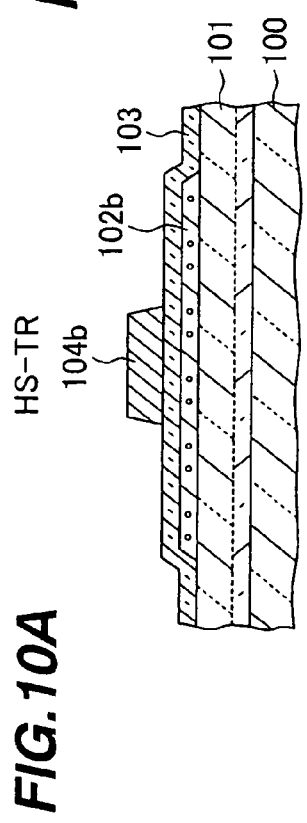
FIG.10E
FIG.10D

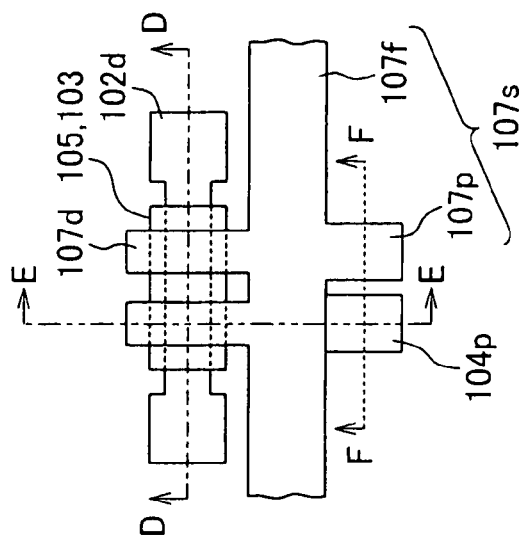
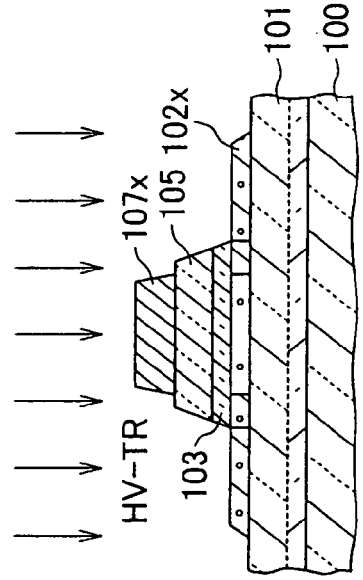 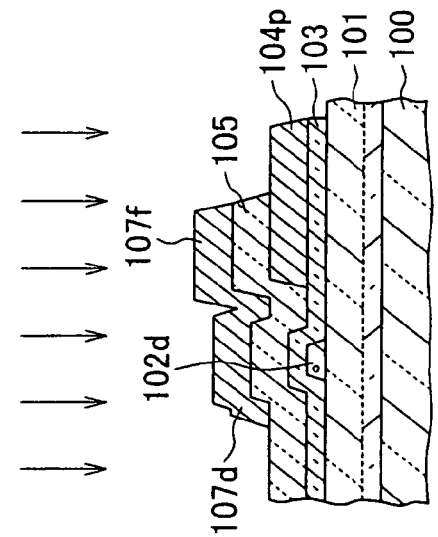
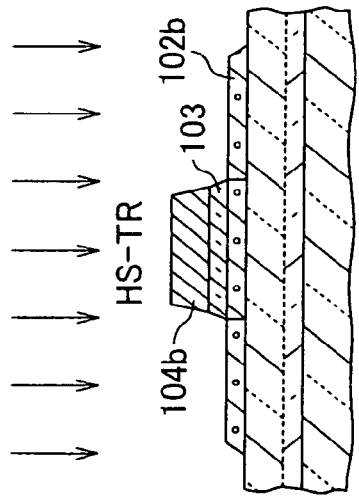 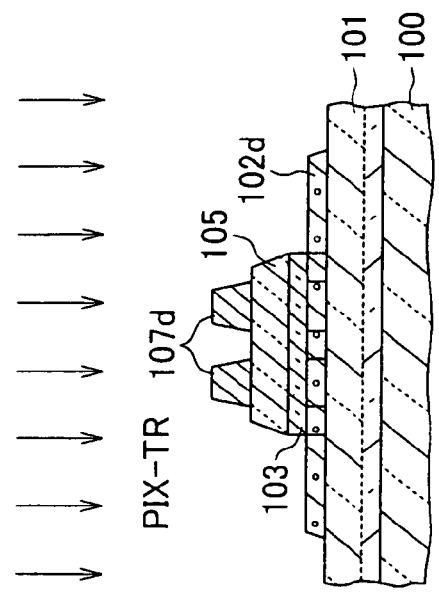
FIG.12A   FIG.12B   FIG.12C
FIG.12D   FIG.12E   FIG.12F

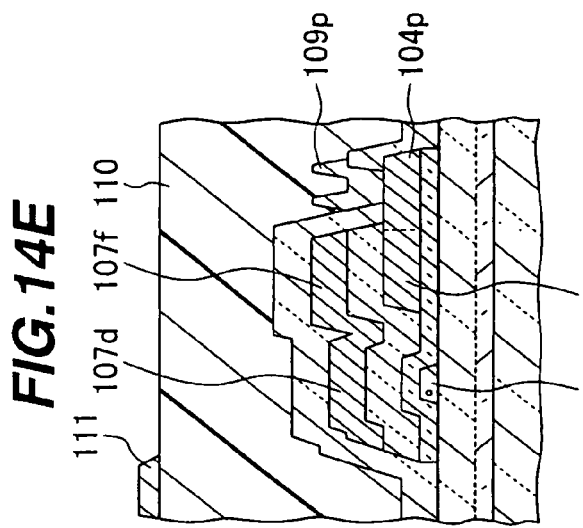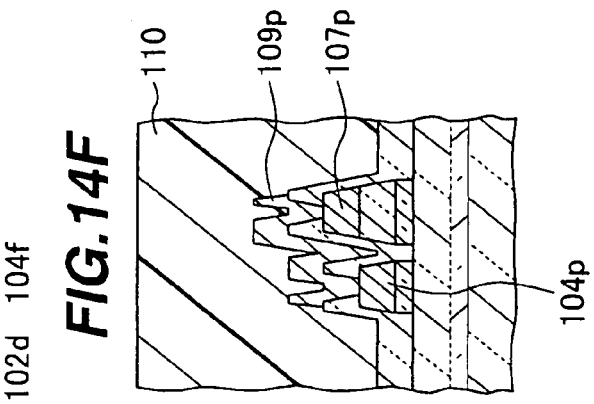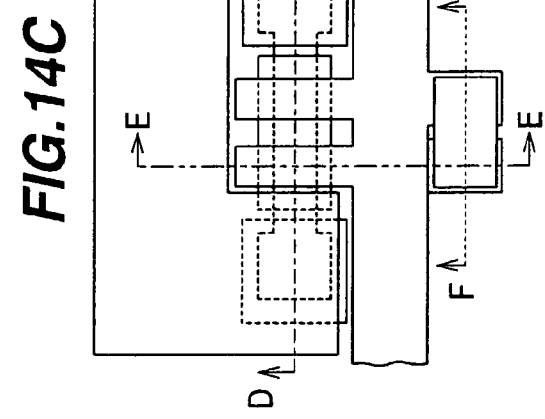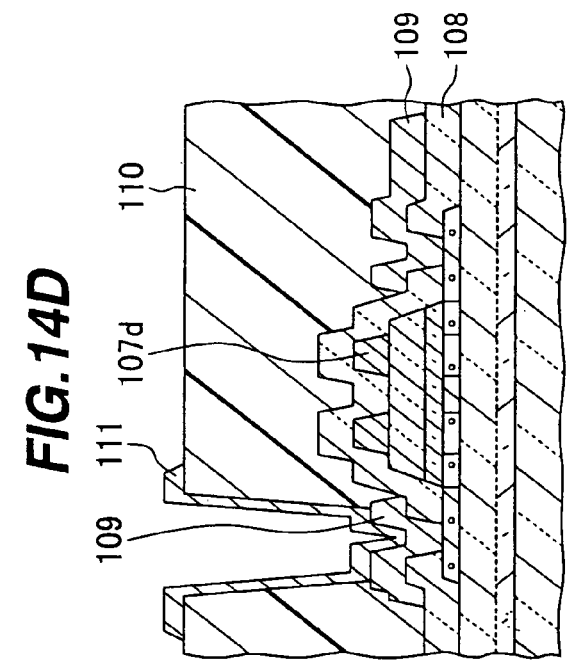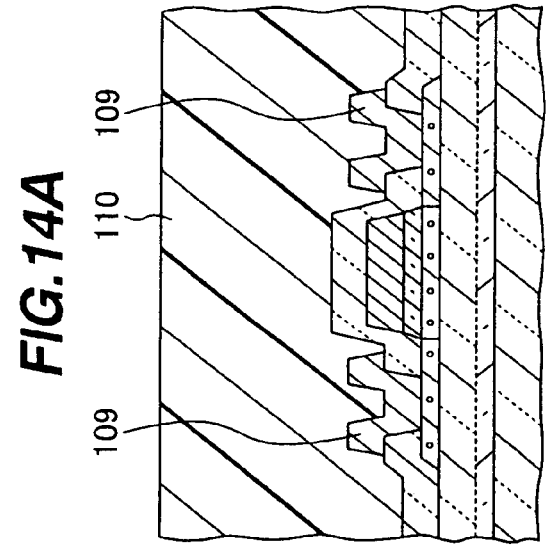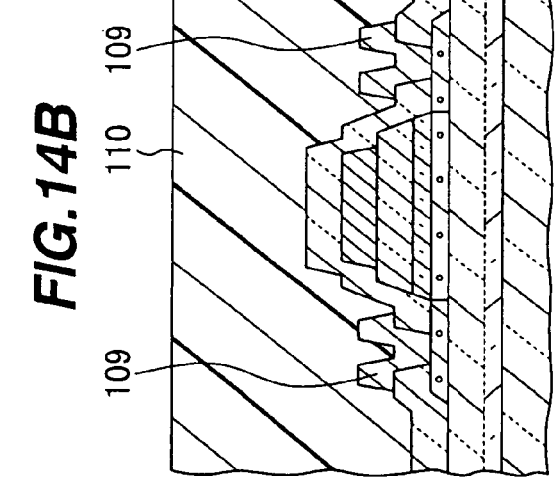

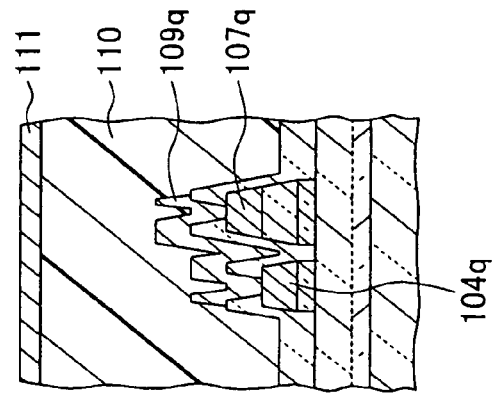
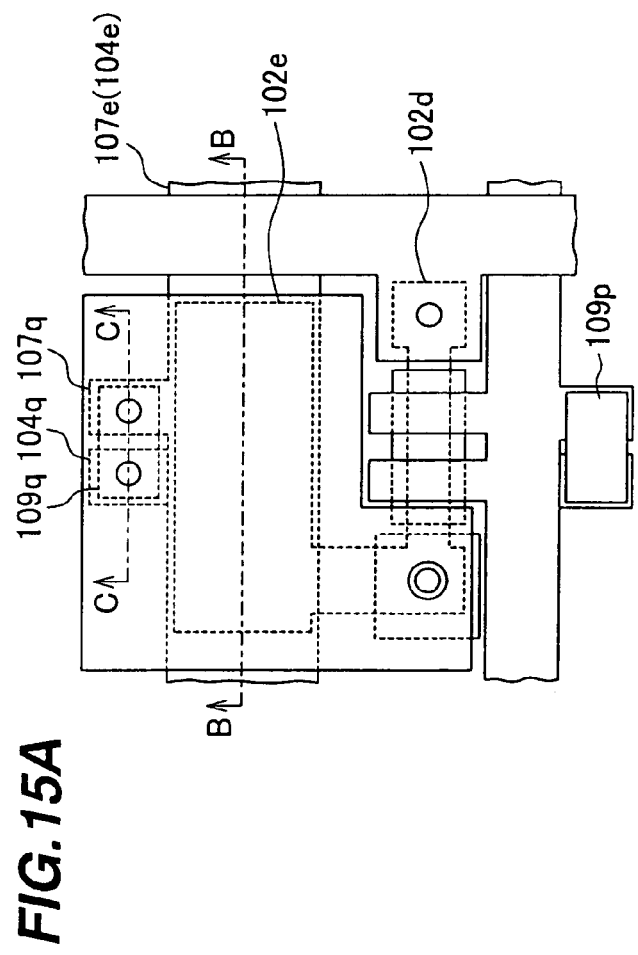
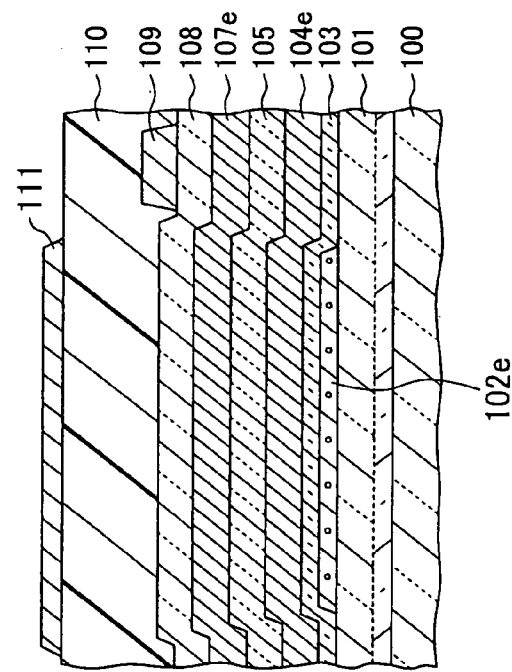
FIG.15A
FIG.15B
FIG.15C

ACTIVE MATRIX SUBSTRATE FOR DISPLAY DEVICE AND ITS MANUFACTURE METHOD

CROSS REFERENCE TO RELATED APPLICATION

This application is based on and claims priority of Japanese Patent Applications No. 2004-124973 filed on Apr. 21, 2004 and No. 2004-236393 filed on Aug. 16, 2004, the entire contents of which are incorporated herein by reference.

BACKGROUND OF THE INVENTION

A) Field of the Invention

The present invention relates to a display device substrate and its manufacture method, and more particularly to a display device active matrix substrate having thin film transistors and its manufacture method.

B) Description of the Related Art

Liquid crystal display devices and organic EL display devices have been used recently as flat panel display devices. The functions of a display device can be improved by using an active matrix having a switching element (active element) for each display pixel. Such an active matrix substrate is widely used with a personal computer (PC), a portable phone and the like.

When thin film transistors are formed on a glass substrate, an amorphous silicon film is used at the early stage because of a limit of a heat resistance temperature of the glass substrate. Recently, high performance polysilicon transistors having a mobility improved much more than that of an amorphous silicon transistor can be manufactured by polycrystallizing an amorphous silicon film or depositing a polysilicon film directly. If a polysilicon film is used, a peripheral circuit can be mounted on the same substrate. In association with this arrangement, developments aiming at a higher performance and lower consumption power are now in progress.

FIG. 22 shows an example of the structure of an active matrix substrate. A display area DA for display and a peripheral circuit area PH, adjacent to a display area, for peripheral circuits are defined on an insulating transparent substrate SUB such as a glass substrate. In the display area DA, a plurality of scanning gate wiring lines (bus lines) GL for scanning extend along a row (horizontal) direction and a plurality of image data wiring lines (bus lines) DL for image data supply extend along a column (vertical) direction.

At each cross point between the scanning gate wiring line GL and image data wiring line DL, a thin film transistor is connected whose output terminal is connected to a pixel electrode PX made of a transparent electrode such as ITO. One electrode of a supplemental capacitor SC is connected to each pixel element PX. The other electrode of the supplemental capacitor SC is connected to a supplemental capacitor wiring line (bus line) SCL maintained at a constant potential. In the structure shown in FIG. 22, although the supplemental capacitor wiring lines SCL extend along the row direction, they may extend along the column direction.

In the display area DA, pixels are disposed in a matrix shape as described above, and each pixel has the pixel electrode PX for controlling display. The scanning gate wiring line GL is disposed along the pixel row and the image data wiring line DL is disposed along the pixel column. The thin film transistor TFT controlled to be turned on and off by the scanning gate wiring line GL supplies the pixel electrode PX with image data from the image data wring line DL. As the thin film transistor TFT turns on, the pixel electrode PX retains the image data together with the supplemental capacitor SC.

Formed in the peripheral circuit area PH are: a gate driver GD for generating a scan signal group to be supplied to the scanning gate wiring lines; a data driver DD for supplying image data to the image data wiring lines; and a display controller DC for receiving a control signal CS from an external and controlling the gate driver GD and data driver DD. The gate driver GD includes a shift register SR1, a level shifter LS1, an output buffer OB and the like. The data driver DD includes a shift register SR2, a level shifter LS2, an analog switch AS and the like. Reference voltages VL and VH and an image signal ID are supplied from an external.

In an active matrix substrate integrated with peripheral circuits, the display controller DC and shift registers SR1 and SR2 are required to operate at relatively high speed. The level shifters LS1 and LS2, output buffer OB and analog switch AS are required to operate at relatively high voltage and have a high breakdown voltage.

The switching thin film transistors (TFT) used in the display area are required to have a relatively high breakdown voltage. Even if TFTs in the display area are made of only n-channel TFTs, the peripheral circuit PH is preferably made of CMOS circuits. Therefore, in addition to n-channel TFTs, p-channel TFTs are also formed. If all TFTs are formed by using the same gate insulating film, the thickness of the gate insulating film is set same as that of a high breakdown voltage TFT. A MOS capacitor is generally used as the supplemental capacitor in a display device circuit using polysilicon.

FIGS. 23A to 23G are cross sectional views of main processes illustrating one example of a conventional method of manufacturing CMOS thin film transistors and supplemental capacitors used in the circuit shown in FIG. 22.

As shown in FIG. 23A, on a transparent insulating substrate 100 such as a glass substrate, an SiN layer of 50 nm in thickness and an SiO layer of 200 nm in thickness are deposited by chemical vapor deposition (CVD) to form a buffer layer 101. On the buffer layer 101, an amorphous silicon film is deposited by CVD and polycrystallized into a polysilicon film by annealing with excimer laser. A polysilicon film may be deposited directly. After the polysilicon film is formed, it is patterned into an island silicon layer 102 by photolithography and etching. Three island silicon films shown in FIG. 23A are used for a p-channel TFT, an n-channel TFTs and a supplemental capacitor, starting from the left.

As shown in FIG. 23B, an SiO layer 103 of 120 nm in thickness covering the island silicon films 102 is deposited by CVD to form a gate insulating film. On the insulating gate film 103, an Mo layer 104 of 300 nm in thickness is deposited by physical vapor deposition (PVD) such as sputtering, and patterned by photolithography and etching to form electrodes 104. The two electrodes on the left side are gate electrodes and one electrode on the right side is a capacitor upper electrode.

After the gate electrodes and capacitor upper electrodes are patterned, the gate insulting films 103 are patterned wider than the electrodes 104 by photolithography and etching.

As shown in FIG. 23C, a photoresist pattern PRn is formed covering the p-channel transistor and opening the n-channel transistor and supplemental capacitor, and $P^+$ ions are implanted at two steps. One ion implantation is performed at an acceleration energy and a dose which allow ions to be implanted into the exposed silicon film and does not allow the ions to be implanted into the electrode 104 and insulating film 103 not to reach the semiconductor layer. The other ion implantation is performed under the condition which allows some of the ions implanted into the insulating film 103 to pass through the insulating film 103 and reach the semiconductor layer 102 to form ion implanted regions of a low impurity concentration.

In this manner, low concentration drain regions LDD are formed under the gate insulating film on both sides of the gate electrode and high concentration drain regions HDD are formed on both sides of the gate insulating film. Thereafter, the photoresist pattern PRn is removed.

As shown in FIG. 23D, a photoresist pattern PRp is formed covering the n-channel transistor and supplemental capacitor and opening the p-channel transistor, and p-type impurities such as B$^+$ ions are implanted at two steps.

One ion implantation is performed under the conditions that only the ions directly implanted into the semiconductor layer 102 are doped in the semiconductor layer and the impurities implanted into the electrode 104 and insulating film 103 do not reach the semiconductor layer 102. The other ion implantation is performed under the conditions that some of the impurities implanted into the insulating film 103 pass through the insulating film 103 and reach the semiconductor layer 102 to form low impurity concentration regions.

Since the LDD regions are not necessarily required in the p-channel transistor, the ion implantation may be performed once under the conditions of an acceleration energy and a dose allowing to achieve a desired high concentration, without forming the LDD regions. The photoresist pattern PRp is thereafter removed.

As shown in FIG. 23E, on the substrate subjected to the ion implantation, an SiO layer of 60 nm in thickness is deposited by CVD using Si source gas such as silane and O source gas such as oxygen, and an SiN layer of 360 nm in thickness is deposited by CVD using Si source gas such as silane and N source gas such as NH$_3$, to thereby form a first interlayer insulating film 108.

After the first interlayer insulating film 108 is formed, annealing is performed for 2 hours at 550° C. to activate the implanted impurity ions. During this annealing process, hydrogen is dissociated from the SiN layer formed by the hydrogen-containing source gas such as NH$_3$, so that the hydridation process of the semiconductor layer is performed.

Instead of thermal annealing, activating impurities may be performed by laser annealing and thereafter by annealing at 360° C. to perform the hydridation process of the semiconductor layer.

After the hydridation process of the semiconductor layer, a resist pattern is formed on the first interlayer insulating film 108 and etched to form openings therethrough to open desired areas of the semiconductor layer 102.

As shown in FIG. 23F, a Ti layer of 100 nm in thickness, an Al or Al alloy layer of 200 nm in thickness and a Ti layer of 50 nm in thickness are deposited by physical vapor deposition (PVD) to form an electrode layer. A resist pattern is formed on the electrode layer and etched to leave electrode/wiring patterns 109 leading desired regions of the semiconductor layer 102 to the upper surface of the first interlayer insulating film 108. The resist pattern is thereafter removed.

As shown in FIG. 23G, a transparent insulating resin layer of 3 μm in thickness covering the wiring patterns 109 is formed on the first interlayer insulating film 108 to thereby form a second interlayer insulating film 110. Contact holes are formed through the second interlayer insulating film by photolithography and etching, to expose the wiring patterns 109. If photosensitive resin is used as the second interlayer insulating film, contact holes can be formed by exposing and developing the second interlayer insulating film.

An ITO layer of 100 nm in thickness is deposited by PVD, being connected to the wiring patterns 109 exposed in the openings. The ITO layer is patterned by photolithography and etching to form a pixel electrode 111. The pixel electrode 111 is connected to the source/drain region of the n-channel TFT functioning as the switching transistor of the pixel, and to one electrode 102 of the supplemental capacitor. The other electrode 104 of the supplemental capacitor constitutes the supplemental capacitor bus line. In this manner, the p-channel TFT, n-channel TFT and supplemental capacitor SC can be formed.

It is preferable to shorten the channel length and dispensing with the LDD structure of a TFT which is required to operate at high speed. To this end, a circuit power source voltage is desired to be low. Generally, in order to lower the power source voltage, it is necessary to lower the threshold value of TFT and thin the gate insulating film. A high breakdown voltage TFT is required to be resistant against a predetermined high voltage, and has preferably the TFT structure having a conventional gate insulating film thickness and LDD structure. It is difficult to satisfy both the requirements by using the same TFT structure. Technologies of forming two types of TFTs on the same substrate have been proposed.

Japanese Patent Laid-open Publication No. 2003-45892 proposes the structure that after an island semiconductor layer is formed, a first gate insulating film suitable for low voltage TFTs is formed, a gate electrode is formed on the island semiconductor layer for the low voltage transistor, whereas for the high voltage transistor and pixel transistor, a second gate insulating film is stacked on the first gate insulating film and a gate electrode is formed on the second gate insulating film. The first gate insulating film of the low voltage transistor is, for example, 30 nm in thickness, and the gate insulating film of the high voltage transistor as a lamination of the first and second gate insulating films is, for example, 130 nm in thickness.

In order to further sophisticate the performance of TFT, new crystallization technologies have been proposed.

Japanese Patent Laid-open Publication No. 2003-86505 proposes the technologies of patterning an amorphous silicon semiconductor layer in an island shape, and thereafter polycrystallizing the semiconductor layer by irradiating from the bottom of a transparent substrate a continuous wave (CW) laser beam using a solid state laser excited by a laser diode semiconductor; a diode pumped solid state laser (DPSS laser). This publication describes that large crystal grains can be formed by this crystallization method.

In the TFT manufacture processes, impurities are activated by thermal annealing or laser annealing. The thermal annealing is desired to obtain a high reliability. If a high speed operation circuit is made of specific TFTs or crystallization is performed by a CW laser beam, the thermal annealing is desired to be used for annealing impurities.

If thermal annealing is to be performed, it is not proper to use aluminum or aluminum alloy as the metal wiring, but refractory metal is required to be used. Refractory metal has a higher resistance than that of aluminum or aluminum alloy and there arises the problem of a high wiring resistance of a large size panel. If the display device is of a high definition type, it is desired to reduce the area of a supplemental capacitor.

SUMMARY OF THE INVENTION

An object of this invention is to provide a display device active matrix substrate having a plurality type of TFTs having different gate insulating film thicknesses and having a high performance being capable of operating at high speed, and its manufacture method.

Another object of the present invention is to provide a display device active matrix substrate capable of being used as a large size high definition panel and providing a sufficiently bright display panel, and its manufacture method.

According to one aspect of the present invention, there is provided a display device active matrix substrate comprising: an insulating substrate having a display area where pixels are disposed in a matrix shape and a peripheral circuit area disposed in a peripheral area of the display area where peripheral circuits are formed; a plurality of scanning lines formed in the display area along a row direction; a plurality of image data lines formed in the display area along a column direction, the image data lines defining a plurality of pixel areas together with the scanning lines; a pixel transistor island semiconductor layer formed in the display area near at each cross point between the scanning line and the image data line and a plurality of peripheral circuit transistor island semiconductor layers; a first gate insulating film having a first thickness and covering a central portion of the pixel transistor island semiconductor layer; a first gate electrode made of a first wiring layer and disposed on the first gate insulating film; a second gate insulating film having a second thickness thinner than the first thickness and covering at least a partial central portion of the peripheral circuit transistor island semiconductor layer; and a second gate electrode made of a second wiring layer and disposed on the second gate insulating film, wherein the pixel transistor island semiconductor layer, the first gate insulating film and the first gate electrode constitute a pixel transistor, and the scanning line includes a lower scanning wiring line made of the second wiring line and an upper scanning wiring line made of the first wiring line, formed above the lower scanning wiring line and connected to the lower scanning wiring line.

A plurality type of TFTs having different gate insulating film thicknesses can be formed. It is possible to form TFTs required to operate at high speed and TFTs required to have a high breakdown voltage.

If a scanning line is made of a lamination of a lower scanning wiring line and an upper scanning wiring line, the scanning line can be made to have a low resistance, and even if refractory metal is used for the scanning line, its resistance can be lowered. Impurity activation can be made by thermal annealing.

BRIEF DESCRIPTION OF THE DRAWINGS

FIGS. 10A to 10F are cross sectional views and a plan view illustrating main processes of the method of manufacturing a display device active matrix substrate according to the fifth embodiment.

FIGS. 12A to 12F are cross sectional views and a plan view illustrating main processes of the method of manufacturing a display device active matrix substrate according to the fifth embodiment.

FIGS. 14A to 14F are cross sectional views and a plan view illustrating main processes of the method of manufacturing a display device active matrix substrate according to the fifth embodiment.

FIGS. 15A to 15C are cross sectional views and a plan view showing a modification of the fifth embodiment.

DESCRIPTION OF THE PREFERRED EMBODIMENTS

Figure 22:
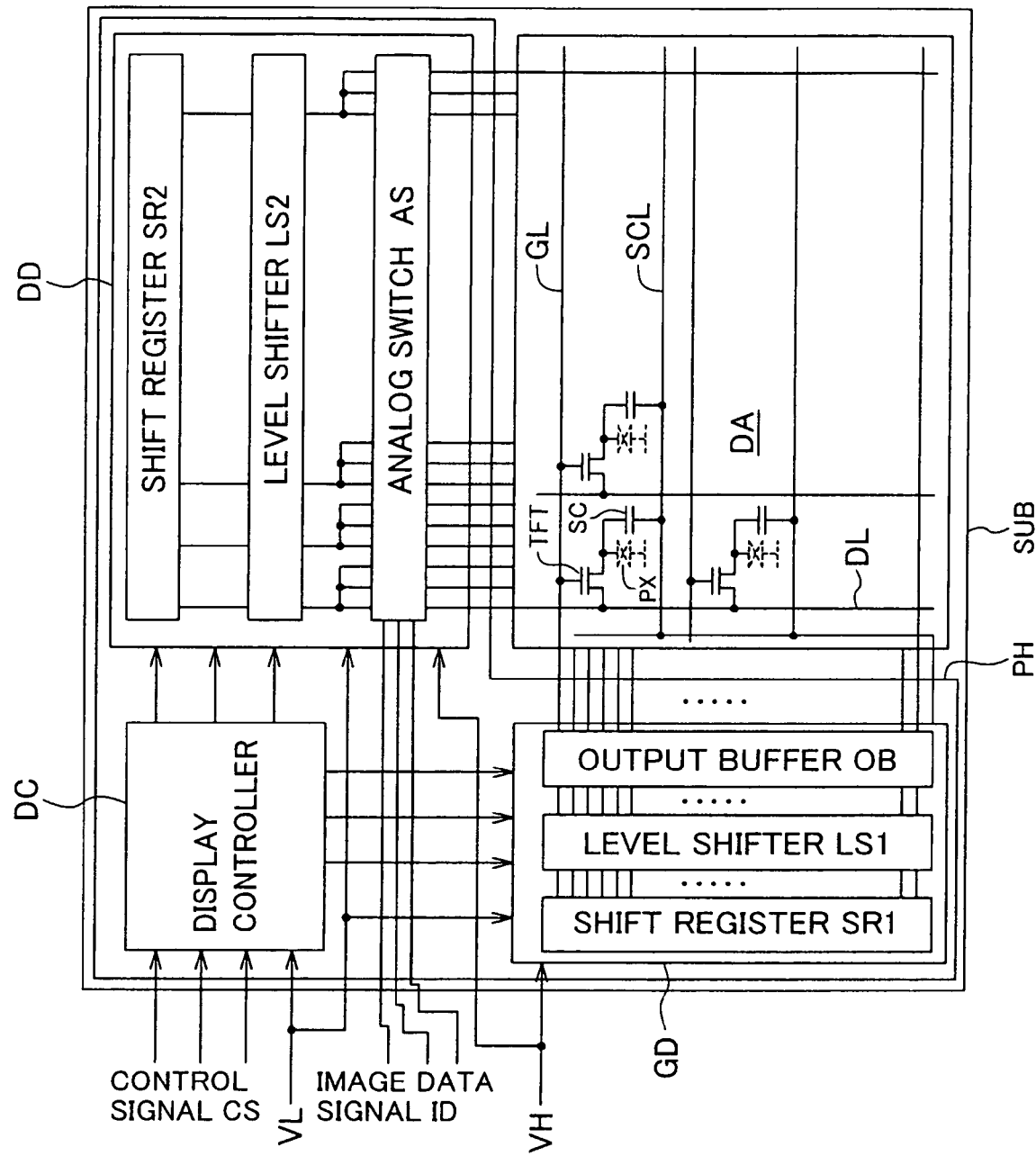
FIG. 22 is a schematic plan view showing the structure of a display device active matrix substrate.
Figure 23A:
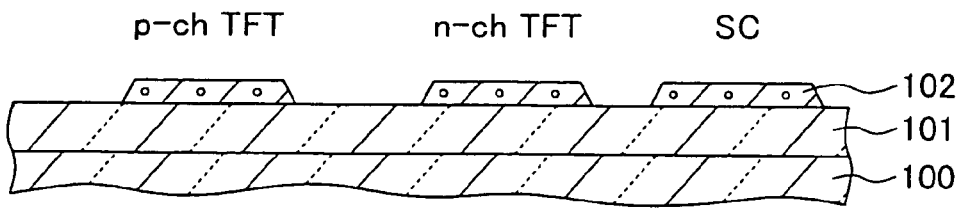
FIGS. 23A to 23G are cross sectional views illustrating main processes of a conventional method of manufacturing a display device active matrix substrate.
Figure 23B:
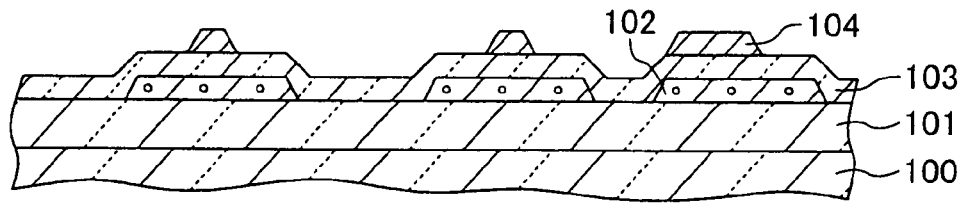
Figure 23C:
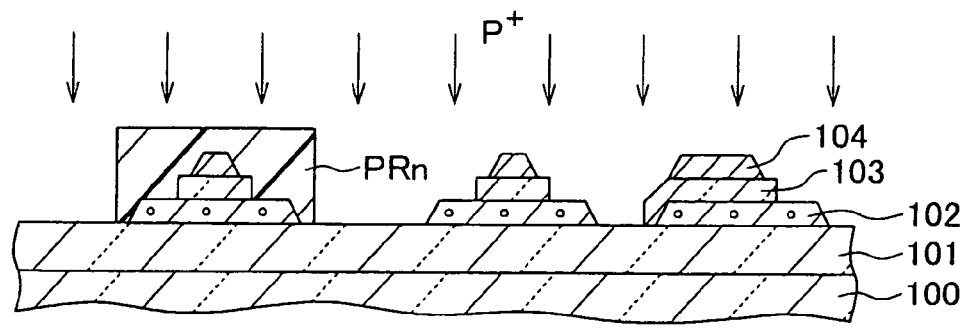
Figure 23D:
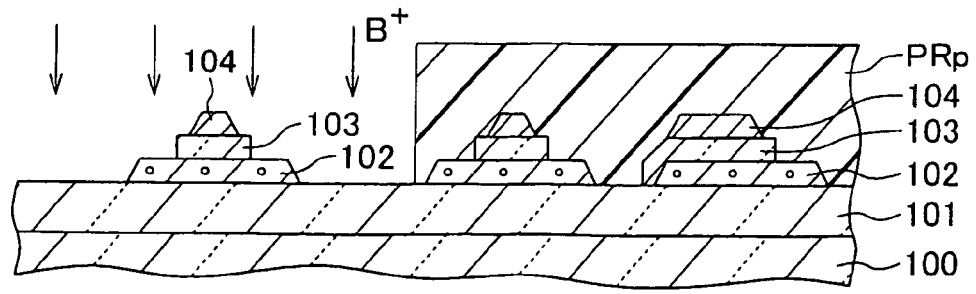
Figure 23E:
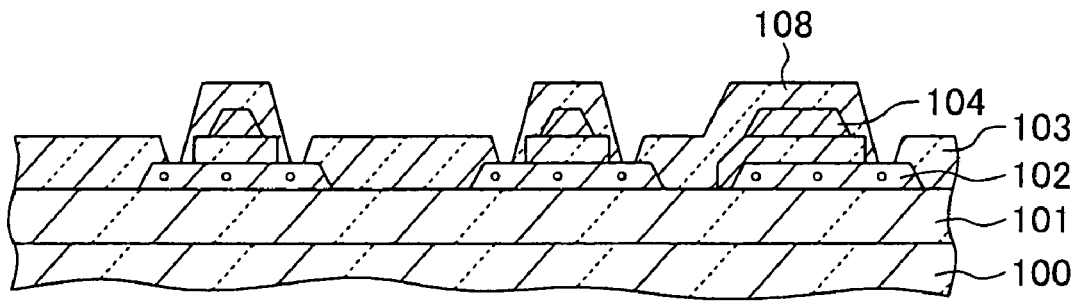
Figure 23F:
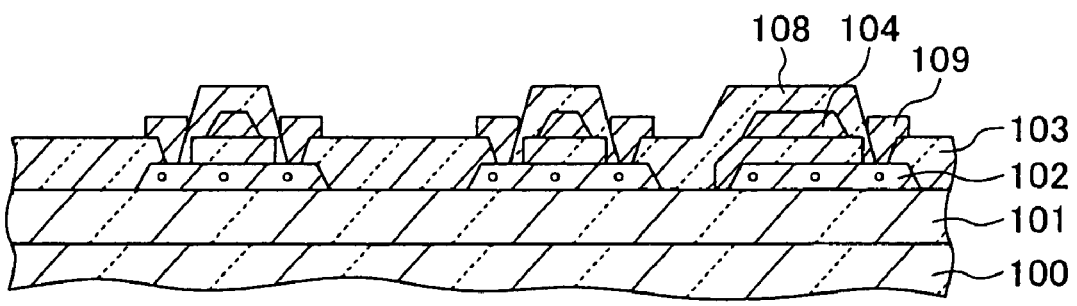
Figure 23G:
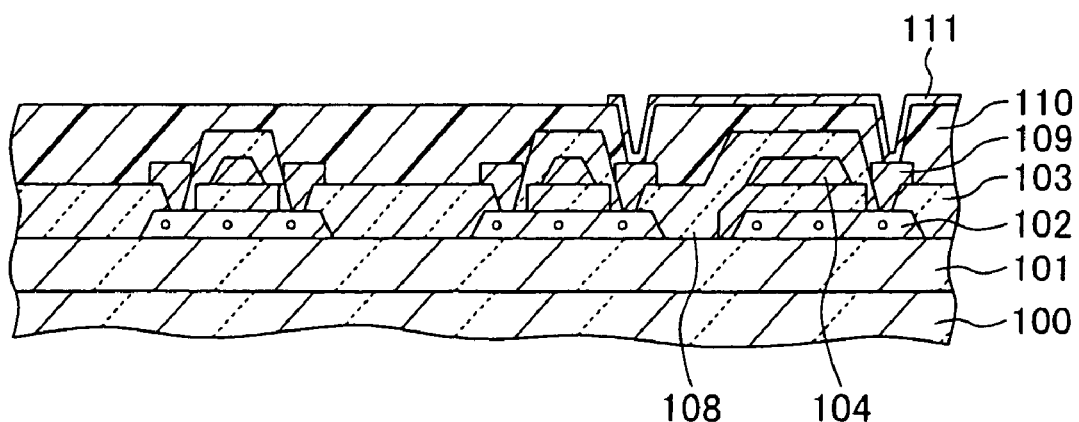

Embodiments of the invention will be described with reference to the accompanying drawings. A display device active matrix substrate to be manufactured has the structure such as shown in FIG. 22. The description made with reference to FIG. 22 is incorporated herein by reference. For the simplicity of description, the following description will be made mainly on a p-channel TFT capable of operating at high speed, an n-channel TFT capable of operating at high speed, a p-channel TFT having a high breakdown voltage, a high breakdown voltage n-channel TFT used as a pixel transistor, and a supplemental capacitor.

FIGS. 1A to 1L are cross sectional views illustrating main processes of a method of manufacturing a display device active matrix substrate according to the first embodiment of the present invention. FIG. 2 is a plan view showing the layout of a pixel area of the active matrix substrate to be manufactured.

Figure 1A:
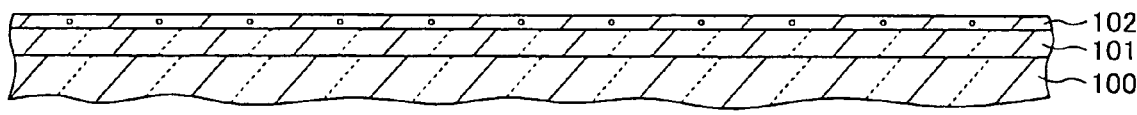
FIGS. 1A to 1L are cross sectional views illustrating main processes of a method of manufacturing a display device active matrix substrate according to a first embodiment of the present invention.
Figure 2:
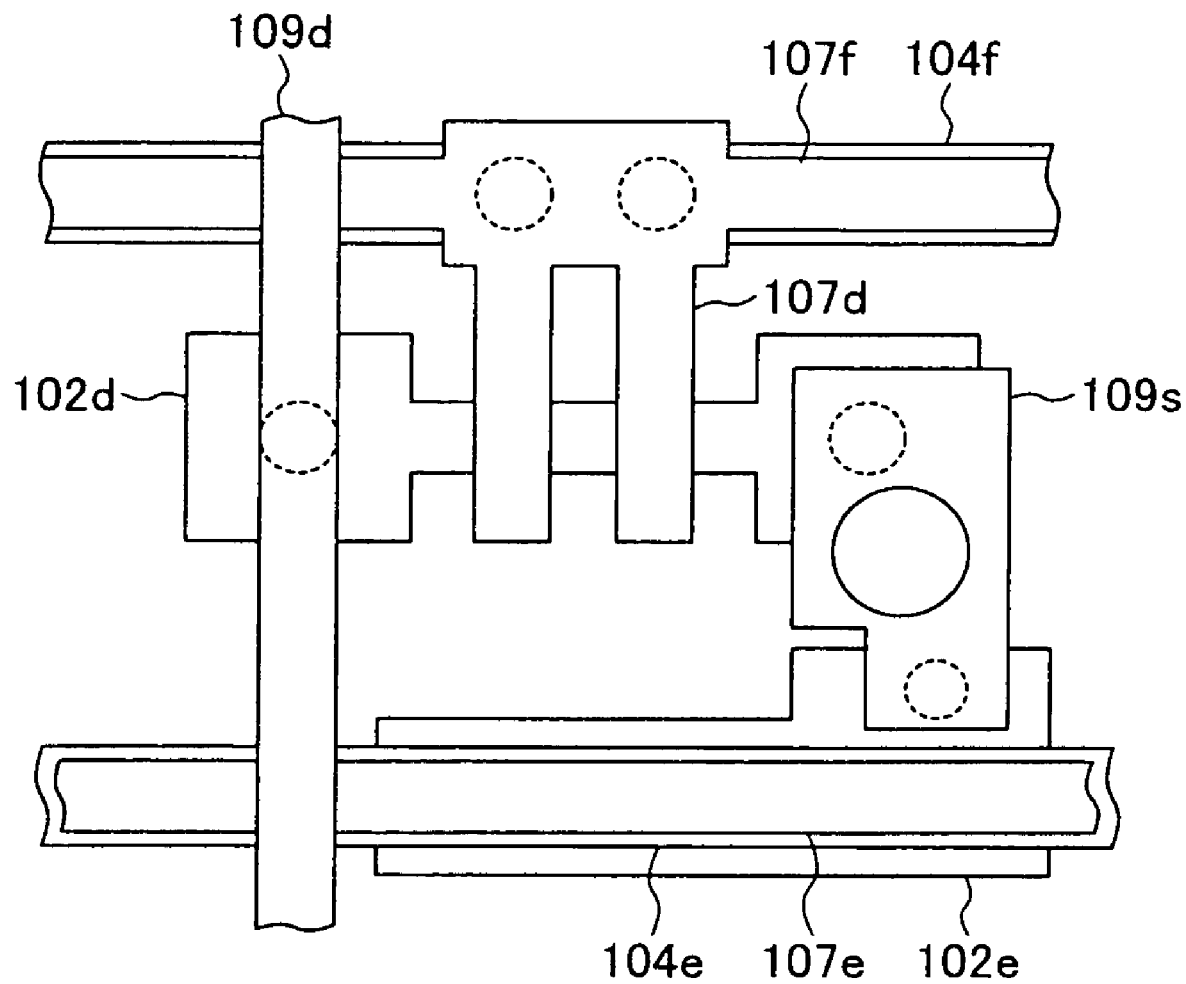
FIG. 2 is a schematic plan view showing the structure of a pixel of the display device active matrix substrate according to the first embodiment.

As shown in FIG. 1A, on a transparent insulating substrate 100 such as a glass substrate, an SiN layer of 50 nm in thickness and an SiO layer of 200 nm in thickness are stacked by CVD to form a buffer layer 101. On the buffer layer 101, an amorphous silicon film 102 is deposited by CVD and polycrystallized by irradiating excimer laser. Instead of polycrystallization by the excimer laser beam of pulse oscillation, polycrystallization may be performed by a solid state laser beam of a continuous wave (CW). A polysilicon film may be deposited directly on the buffer layer 101.

Figure 1B:
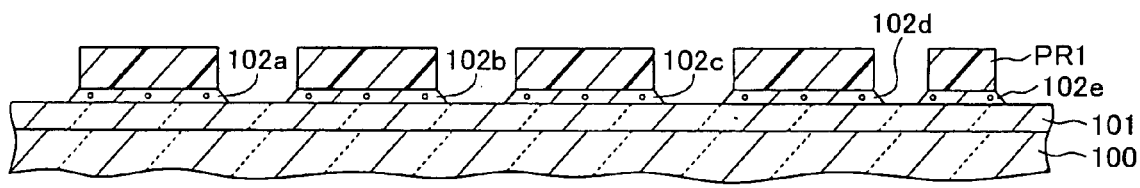

As shown in FIG. 1B, a photoresist layer is coated on the silicon film 102, exposed and developed to form a photoresist pattern PR1. By using the photoresist pattern PR1 as an etching mask, the silicon film 102 is etched to form island semiconductor layers.

Island semiconductor layers 102a and 102b are used for thin film TFTs, island semiconductor layers 102c and 102d are used as thick TFTs, and an island semiconductor layer 102e is used for a supplemental capacitor. The island semiconductor layers 102a, 102b, 102c, 102d and 102e are collectively called a semiconductor layer 102 where appropriate. After the semiconductor layer 102 is patterned, the photoresist pattern PR1 is removed.

As shown in FIG. 2, in each pixel area of a display area, the island semiconductor layer 102d for a pixel transistor is formed having broadened source/drain regions at opposite positions and a narrow channel region at a middle position. The island semiconductor layer 102e constituting a supplemental capacitor lower electrode has a broad connection region and is generally rectangular, extending along the horizontal direction.

Figure 1C:
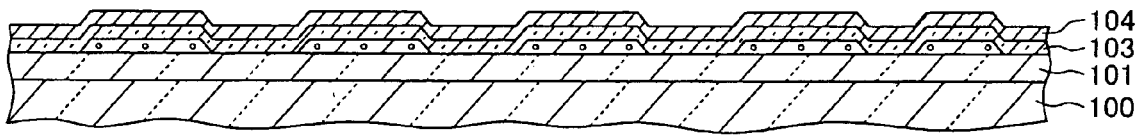

As shown in FIG. 1C, an SiO layer of 30 nm in thickness is deposited covering the patterned island semiconductor layers by CVD to form a first gate insulating film 103. On the first gate insulating film 103, an Mo layer 104 of 300 nm in thickness is deposited by sputtering. Instead of Mo, other refractory metals such as Ta, W and Cr may be used.

Figure 1D:
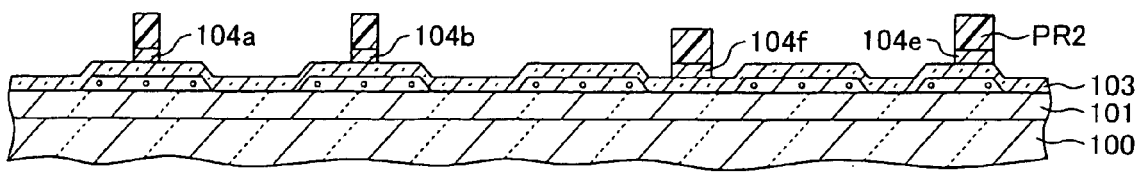

As shown in FIG. 1D, a photoresist layer is coated on the Mo layer 104, exposed and developed to form a photoresist pattern PR2. By using the photoresist pattern PR2 as an etching mask, the Mo layer 104 is patterned. In the thin film TFT area a gate electrode 104a and a gate electrode 104b are patterned, near a thick film TFT in the display area a wiring layer 104f is patterned which is used as a liner wiring layer of a gate wiring line (bus line), and in the supplemental capacitor area a supplemental capacitor bus line 104e is patterned which is also used as a capacitor upper electrode. The photoresist pattern PR2 is thereafter removed. The electrodes 104a, 104b, 104f and 104e are collectively called an electrode 104 where appropriate. In the following the same relation between reference numerals and suffixes is used.

As shown in FIG. 2, the gate bus line 104f extends in the horizontal direction. The wiring layer 104e constituting the supplemental capacitor bus line and upper electrode is narrower than the island semiconductor layer 102e and extends above the island semiconductor layer 102e in the horizontal direction. Since the upper layer is formed narrow, a lamination structure whose step is relaxed is formed so that each step height at the step can be relaxed and coverage is enhanced.

Figure 1E:
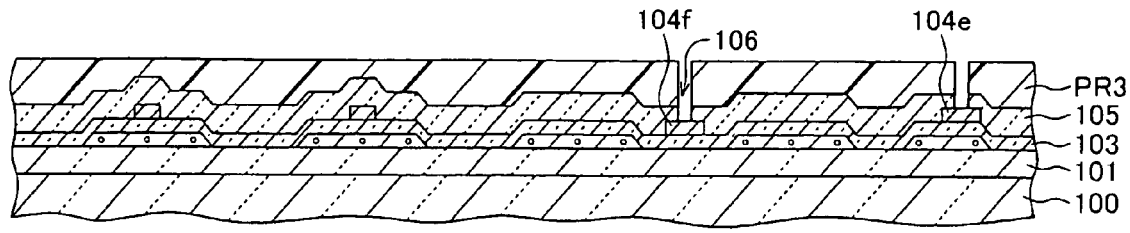

As shown in FIG. 1E, an SiO layer of 80 nm in thickness covering the patterned electrode 104 is deposited by CVD to form a second gate insulating film 105. A photoresist layer is coated, exposed and developed to form a photoresist pattern PR3 having a contact hole pattern partially opening the electrode 104. By using the photoresist pattern PR3 as an etching mask, contact holes 106 are etched through the SiO layer 105, reaching the electrodes 104f and 104e. The photoresist pattern PR3 is thereafter removed.

Figure 1F:
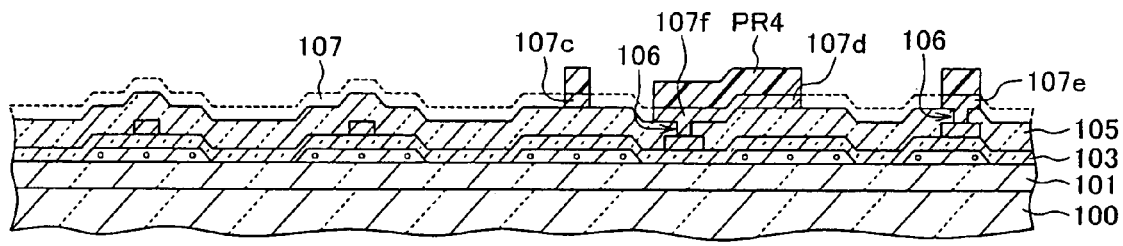

As shown in FIG. 1F, an Mo layer 107 of 300 nm in thickness is deposited on the SiO layer 105 with the contact holes 106 by sputtering. On the Mo layer 107, a photoresist layer is coated, exposed and developed to form a photoresist pattern PR4. By using the photoresist pattern PR4 as an etching mask, the Mo layer 107 is etched. Gate electrodes 107c and 107d for thin film TFTs and a liner bus line 107e of the supplemental capacitor are therefore patterned. The photoresist pattern PR4 is thereafter removed.

As shown in FIG. 2, the gate electrode 107d is continuous with an upper gate bus line 107f and traverses in a bifurcated shape the channel region defined in the island semiconductor layer 102d at the middle position, to thereby constitute a double-gate TFT structure. The upper gate bus line 107f narrower than the lower gate bus line 104f is formed above the lower gate bus line 104f, made wider in the connection area to the gate electrode 107d, and connected to the lower gate bus line 104f. By making the upper layer narrower than the lower layer, each step height can be relaxed as described above.

The supplemental capacitor bus line 107e is connected to the lower bus line 104e above the lower bus line 104e serving also as the supplemental capacitor upper electrode, and constitutes an upper bus line extending in the horizontal direction and being narrower than the lower bus line 104e. The resistance value is lowered because the metal lamination of two layers, the gate bus line and supplemental capacitor bus line, is formed.

Figure 1G:
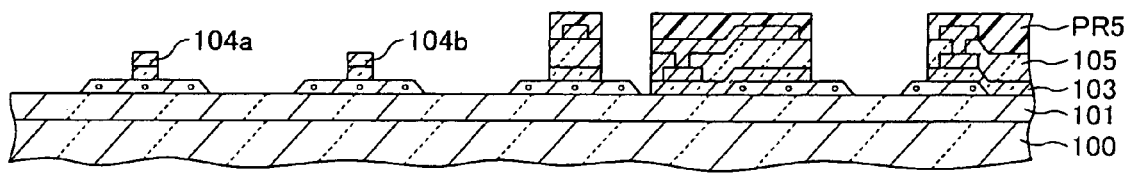

As shown in FIG. 1G, a photoresist layer is coated, exposed and developed to form a photoresist pattern PR5 broader than the gate electrode of the thick TFTs and the supplemental capacitor bus line. By using the photoresist pattern PR5 and the gate electrodes 104a and 104b in the thin film TFT area as an etching mask, the gate insulating films 103 and 105 are etched. In the thin film TFT area, gate insulating films are patterned having the same plan pattern as the gate electrodes 104a and 104b, and in the thin film TFT area, gate insulating films are patterned being broader than the gate electrodes 107c and 107d. In the supplemental capacitor area, an insulating film is patterned being broader than the upper electrode. The photoresist pattern PR5 is thereafter removed.

Figure 1H:
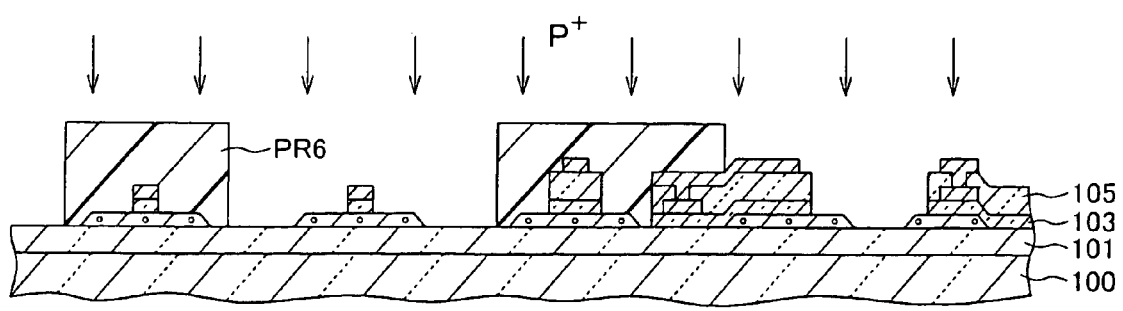
Figure 1I:
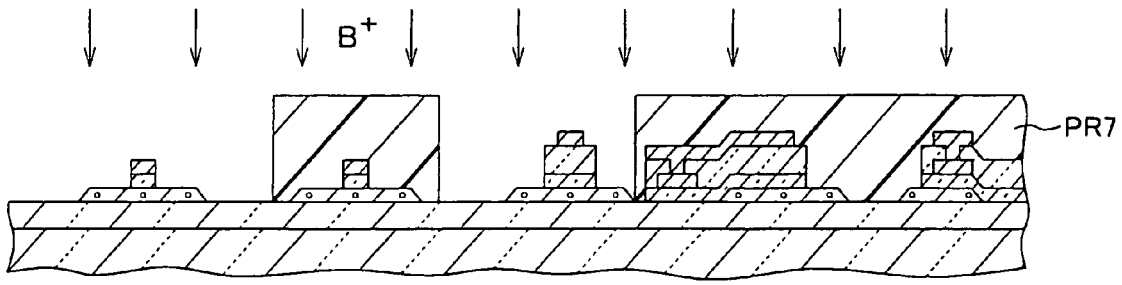

As shown in FIG. 1H, a photoresist pattern PR6 is formed covering the p-channel TFT area, and n-type impurity ions P$^+$ are implanted. Ion implantation is performed at two steps, ion implantation at an acceleration energy and a dose allowing ions to pass through the gate insulating film, and ion implantation not allowing ions to pass through the gate insulating film. Therefore, LDD regions having a low impurity concentration are formed under the gate insulating film protruding from the gate electrode, and high concentration HDD regions are formed in the source/drain regions exposed on both sides of the gate insulating film. The photoresist pattern PR6 is thereafter removed.

As shown in FIG. 11, a photoresist pattern PR7 is formed covering the n-channel TFT area and supplemental capacitor area, and p-type impurity ions $B^+$ are implanted. Two ion steps are performed: LDD forming ion implantation allowing ions to pass through the gate electrodes; and HDD forming ion implantation allowing impurities to be doped at a high concentration into the semiconductor layer exposed on both sides of the gate insulating film. The photoresist pattern PR7 is thereafter removed. These ion implantation processes are similar to the conventional ion implantation processes described with reference to FIGS. 23A to 23G.

Figure 1J:
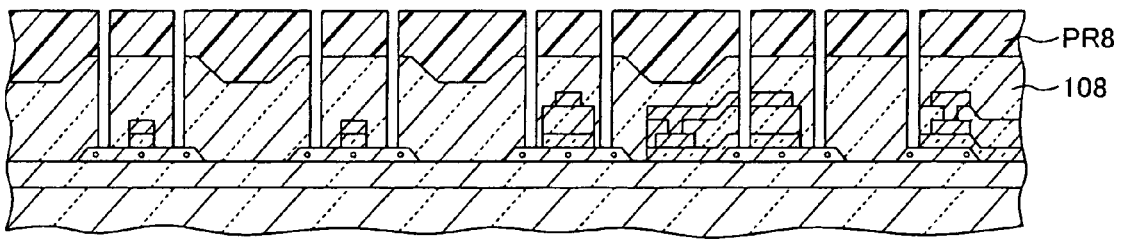

As shown in FIG. 1J, an SiO layer of 60 nm in thickness and an SiN layer of 350 nm in thickness covering the formed transistor structure, are deposited by CVD to form a first interlayer insulating film 108. After the first interlayer insulating film is formed, annealing is performed for 2 hours at 500° C. to activate the implanted impurities and hydridate the semiconductor layers. A photoresist layer is coated on the first interlayer insulating film 108, exposed and developed to form a photoresist pattern PR8 for forming contact holes. By using the photoresist pattern PR8 as an etching mask, the interlayer insulating film 108 is etched to form contact holes. The photoresist pattern PR8 is thereafter removed.

Figure 1K:
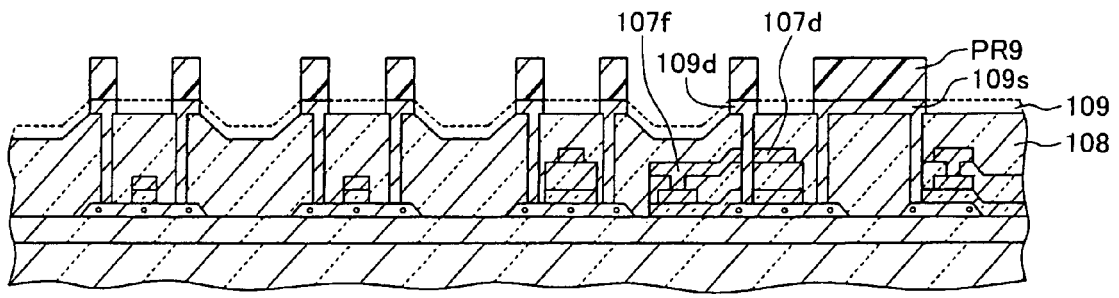

As shown in FIG. 1K, a Ti layer of 100 nm in thickness, an Al layer of 200 nm in thickness and a Ti layer of 50 nm in thickness are deposited by sputtering on the first interlayer insulating film 108 formed with contact holes, to form an electrode/wiring layer 109. A photoresist pattern PR9 is formed on the electrode/wiring layer 109 to pattern the electrode/wiring layer 109.

With this process, wiring lines 109s, 109d and the like are formed to lead upward each transistor region and supplemental capacitor region. The photoresist pattern PR9 is thereafter removed. Instead of the lamination of the Ti layer, Al layer and Ti layer as the wiring layer, the lamination of a Ti layer, an Mo layer and an Al alloy layer or the like may be used.

With the structure shown in FIG. 1K, the electrode/wiring layer 109s constitutes an interconnect wiring for connecting the source/drain region of the p-channel thick film TFT and the lower electrode of the supplemental capacitor. Although the wiring line 109d and the gate electrode 107d are shown crossing in the thick film TFT area, they are at different positions along the direction vertical to the drawing sheet and are electrically separated.

As shown in FIG. 2, the wiring line (data bus line) 109d connected to the drain region of the island semiconductor layer 102d extends in the vertical direction in FIG. 2 and constitutes the data wiring line (bus line). The local wiring line 109s interconnects the source region of the thick film TFT and the lower electrode 102e of the supplemental capacitor.

Figure 1L:
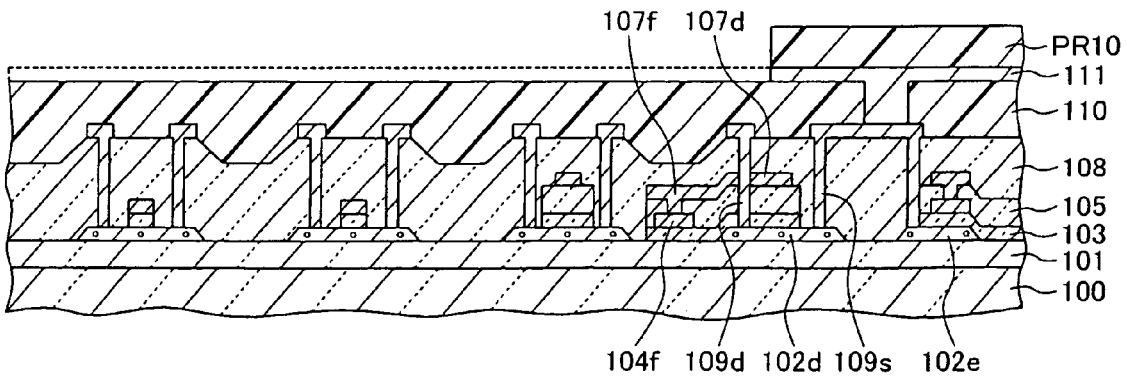

As shown in FIG. 1L, on the first interlayer insulating film 108, a transparent insulating resin layer of 3 μm in thickness is coated covering the electrode layer to form a second interlayer insulating film 110. Contact holes are formed through the second interlayer insulating film 110 by exposure and development and the like. On the second interlayer insulating film 110 formed with contact holes, an indium tin oxide (ITO) layer 111 is deposited by CVD or sputtering. A photoresist pattern PR10 is formed on the ITO layer 111. By using the photoresist pattern PR10 as an etching mask, the ITO is etched. The photoresist pattern PR10 is thereafter removed. The ITO electrode 111 constitutes a pixel electrode.

As shown in FIG. 2, the island semiconductor layer 102d constitutes the broad source/drain regions at opposite positions. The middle narrow portion constitutes the channel region. The gate bus lines 104f and 107f and supplemental capacitor bus lines 104e and 107e extend in the horizontal direction in FIG. 2. The data bus line 109 extends in the vertical direction in FIG. 2. Since the bus line is made of a lamination metal layer, the resistance of the bus line can be lowered.

In the embodiment described above, a MOS capacitor is used as the supplemental capacitor. Instead of the MOS capacitor, a supplemental capacitor having opposing metal layers may be formed. Instead of crystallization by an excimer laser beam, a continuous wave laser beam may be used. In this case, a beam converged in a spot shape is used. In the crystallization using an excimer laser beam, the excimer laser beam is shaped into a linear beam and irradiated to the semiconductor layer. If a laser beam of a spot shape is used to scan a predetermined area, it takes a time proportional to the area. As the area of a semiconductor layer to be crystallized is made smaller, the time taken to crystallize can be shortened.

FIGS. 3A to 3E and FIG. 4 are cross sectional views and a plan view illustrating a method of manufacturing a display device active matrix substrate according to the second embodiment of the present invention.

Figure 3A:
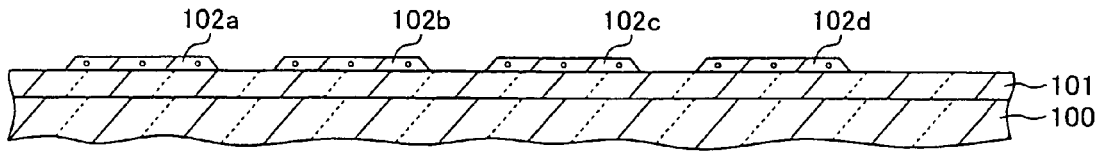
FIGS. 3A to 3E are cross sectional views illustrating main processes of a method of manufacturing a display device active matrix substrate according to a second embodiment of the present invention.

FIG. 3A shows the stage that patterning the silicon film is completed, and corresponds to FIG. 1B. Two thin film TFT island semiconductor layers 102a and 102b and two thick film TFT island semiconductor layers 102c and 102d are formed. An island semiconductor layer is not formed in the supplemental capacitor area.

Figure 4:
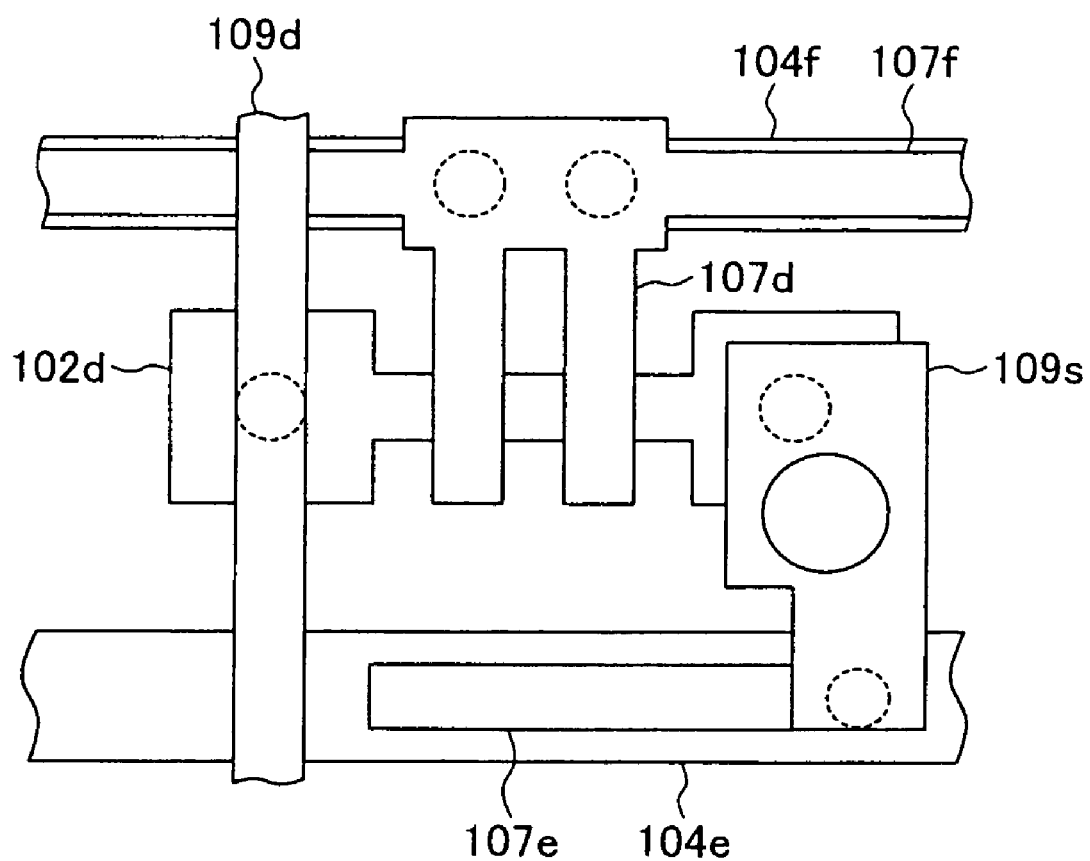
FIG. 4 is a schematic plan view showing the structure of a pixel of the display device active matrix substrate according to the second embodiment.

FIG. 4 shows only the pixel thick film TFT island semiconductor layer 102d. Since a silicon film is not used for the supplemental capacitor, the surface area of the silicon film is reduced by an amount corresponding to the area of the supplemental capacitor, as compared to the first embodiment. If polycrystallization is performed by a continuous wave (CW) laser beam of a spot shape, the time taken to polycrystallize can be shortened. Another method may be used for polycrystallization.

Figure 3B:
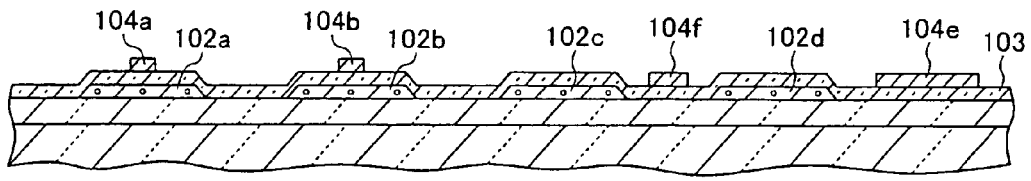

FIG. 3B shows the state that the gate electrodes 104a and 104b of the thin film TFT are patterned, and corresponds to FIG. 1D. The gate bus line 104f in the display area is patterned at the same time. These structures are similar to the first embodiment. In the supplemental capacitor area, a patterned electrode 104e constitutes the lower electrode of the supplemental capacitor.

As shown in FIG. 4, the lower electrode 104e of the supplemental capacitor extends in the row direction along with the gate bus line 104f, and constitutes the supplemental capacitor bus line.

Figure 3C:
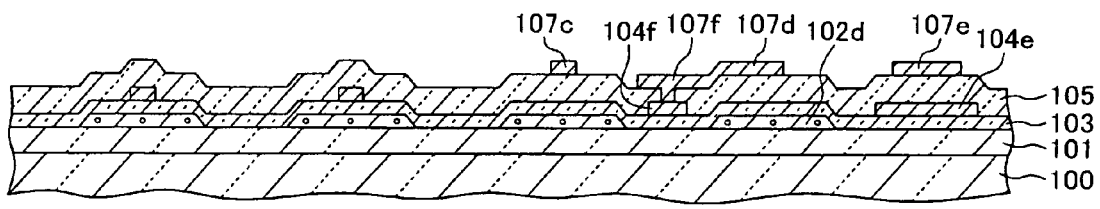

As shown in FIG. 3C, a second gate insulating film 105 of SiO covering the electrode/wiring layer 104 such as the gate bus line 104f, is formed on the first gate insulating film 103 to form a thick film TFT gate insulating film. On the SiO insulating film 105, gate electrodes 107c and 107d of the thick film TFTs, a gate bus line 107f and an upper electrode 107e of the supplemental capacitor, are patterned.

As shown in FIG. 4, similar to the first embodiment, the gate bus line is formed by a lamination of the refractory metal layers 104f and 107f. In the supplemental capacitor area, a supplemental capacitor upper electrode 107e of each pixel is formed above the supplemental capacitor bus line (serving also as the lower electrode) 104e of refractory metal extending in the lateral direction, with an insulating film 105 being interposed therebetween. The supplemental capacitor upper electrode 107e is narrower than the lower electrode 104e and the supplemental capacitance is formed therebetween. Since each supplemental capacitor is formed independently, the supplemental capacitor bus line is made of a single gate wiring layer.

Ion implantation for an n-channel TFT and a p-channel TFT is performed in the manner similar to the first embodiment. After each transistor structure is formed, a first interlayer insulating film 108 is deposited, which is made of a lamination of an SiO layer and an SiN layer. Activating impurities is performed after the first interlayer insulating film is formed.

Figure 3D:
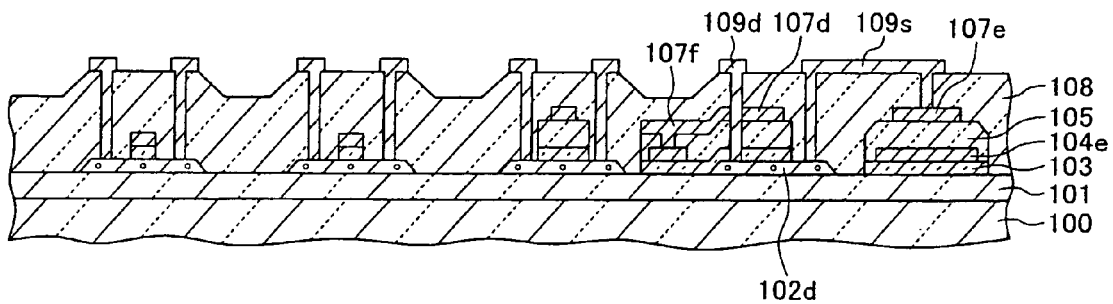

As shown in FIG. 3D, contact holes are formed through the first interlayer insulating film 108, and an electrode layer 109 is deposited and patterned. A local wiring line 109s interconnects the source region of the pixel transistor and the upper electrode 107e of the supplemental capacitor.

As shown in FIG. 4, a drain wiring line 109d extends in the column direction and constitutes the data bus, similar to the first embodiment. The local wiring line 109s is connected to the upper electrode 107e of the supplemental capacitor, slightly different from the first embodiment.

Figure 3E:
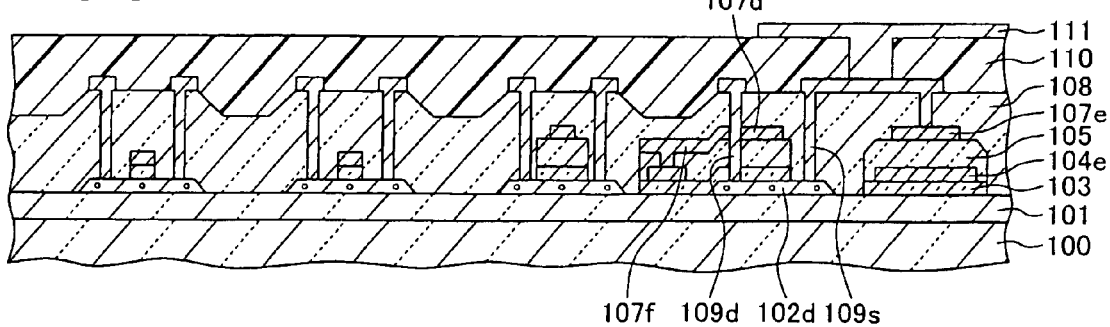

As shown in FIG. 3E, after the wiring line 109 is formed, an organic insulating resin layer of 3 μm in thickness is coated to form a second interlayer insulating film 110. A pixel electrode contact hole is formed through the second interlayer insulating film 110, and an ITO layer 111 is deposited and patterned to form a pixel electrode.

As shown in FIG. 4, in this embodiment, the supplemental capacitor is constituted of the opposing metal layers 104e and 107e, and the source region of the pixel transistor is connected to the upper electrode 107e. Other structures are similar to the first embodiment. In the second embodiment, as the gate wiring line is made of refractory metal such as Mo, it is inevitable that the resistance of the supplemental capacitor bus line becomes high.

FIGS. 5A to 5C and FIG. 6 are cross sectional views and a plan view illustrating the third embodiment which can lower the resistance of the supplemental capacitor bus line.

Figure 5A:
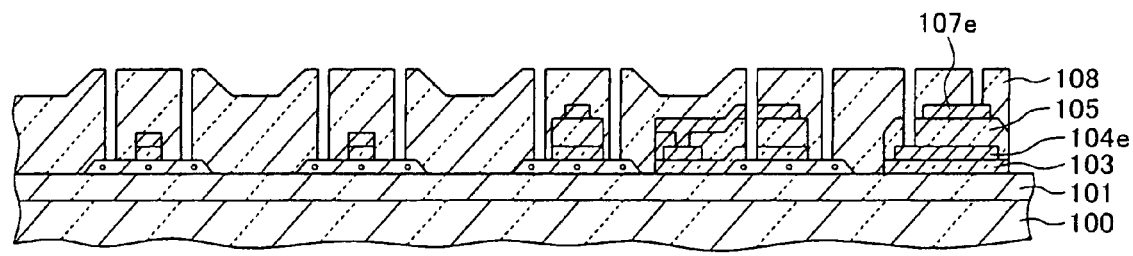
FIGS. 5A to 5C are cross sectional views illustrating main processes of a method of manufacturing a display device active matrix substrate according to a third embodiment of the present invention.

FIG. 5A corresponds to FIG. 1J and shows the state that after each transistor structure and the supplemental capacitor structure are formed, the first interlayer insulating film 108 is deposited covering these structures and contact holes are formed through the first interlayer insulating film. In the supplemental capacitor area, the lower electrode 104 and upper electrode 107e have contact regions.

Figure 6:
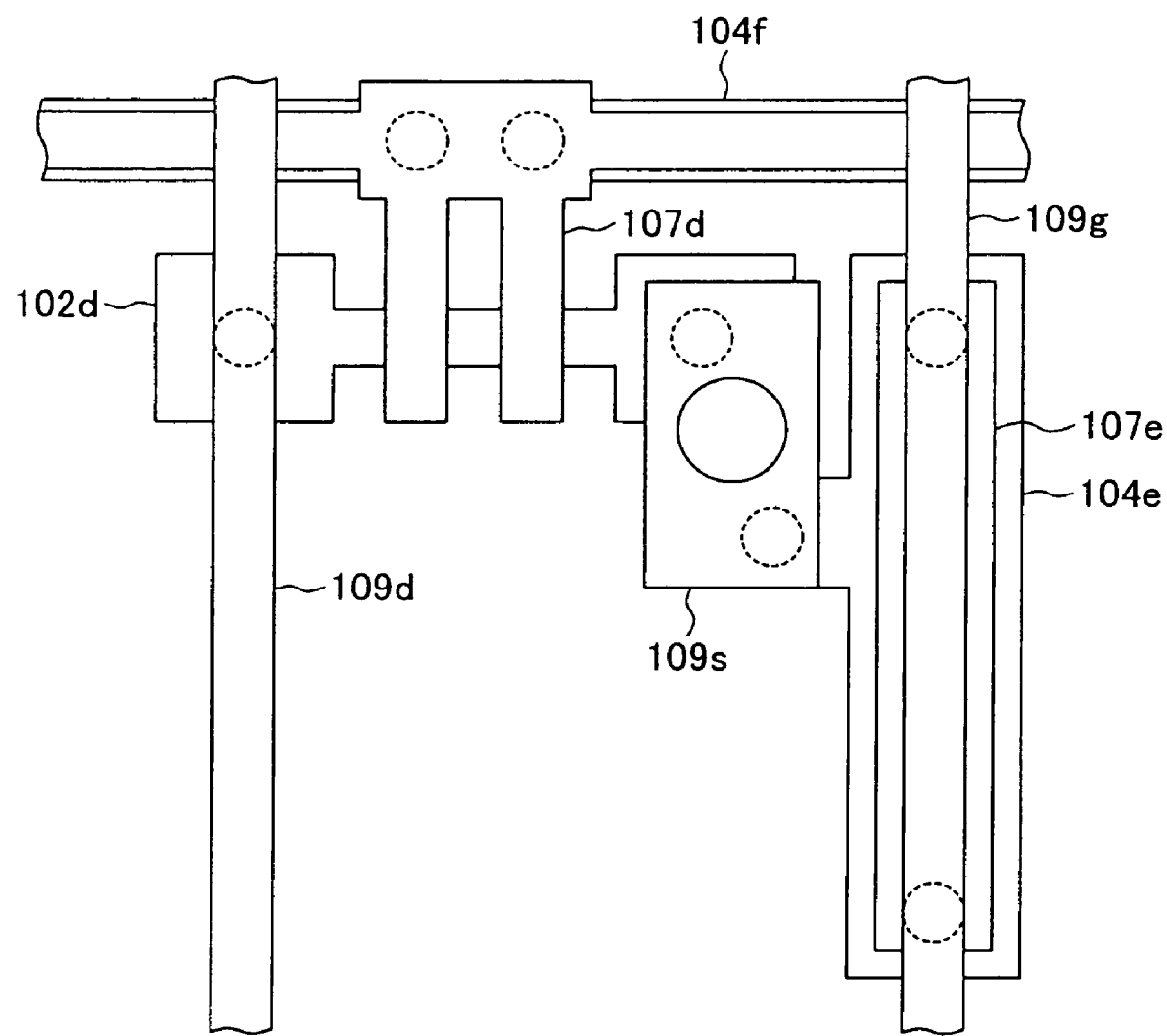
FIG. 6 is a schematic plan view showing the structure of a pixel of the display device active matrix substrate according to the third embodiment.

As shown in FIG. 6, the lower electrode 104e and upper electrode 107e constituting the supplemental capacitor are separated for each pixel and has a shape extending in the column direction. These electrodes may be extended along the row direction as shown in FIGS. 2 and 4. As different from the structure shown in FIGS. 2 and 4, both the lower electrode 104e and upper electrode 107e have the shape not extending outside of the pixel area.

Figure 5B:
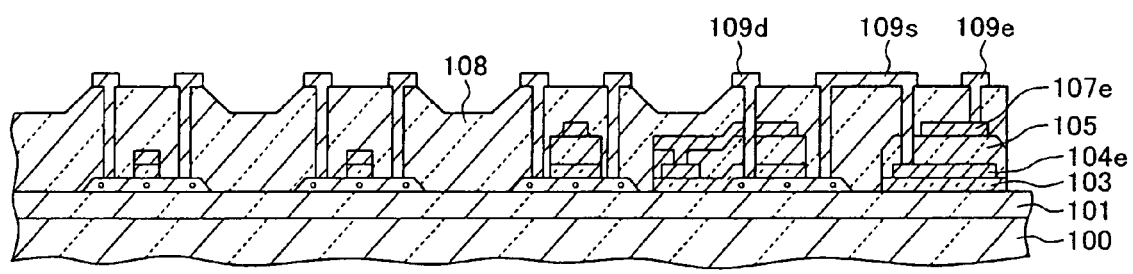

FIG. 5B shows the state that an electrode/wiring layer 109 is deposited and patterned to form each wiring line, and corresponds to FIGS. 1K and 3D. A drain wiring line 109d is connected to the lower electrode 104e of the pixel TFT, and the source of the pixel TFT is connected to the lower electrode 104e of the supplemental capacitor via a local wiring line 109s. A wiring line 109e extending in the vertical direction is connected to the upper electrode 107e of the supplemental capacitor to constitute the supplemental capacitor bus line.

As shown in FIG. 6, the wiring line 109e connected to the upper electrode 107e of the supplemental capacitor extends in the column direction along with a data wiring line 109d and constitutes the supplemental capacitor bus line. Since the wiring line 109 is made of a low resistance metal layer such as Ti/Al/Ti, the resistance of the supplemental capacitor can be lowered. Since the supplemental capacitor bus line is made of the electrode/wiring layer 109, it cannot cross the data wiring line 109d so that the supplemental capacitor bus line extends in the column direction.

Figure 5C:
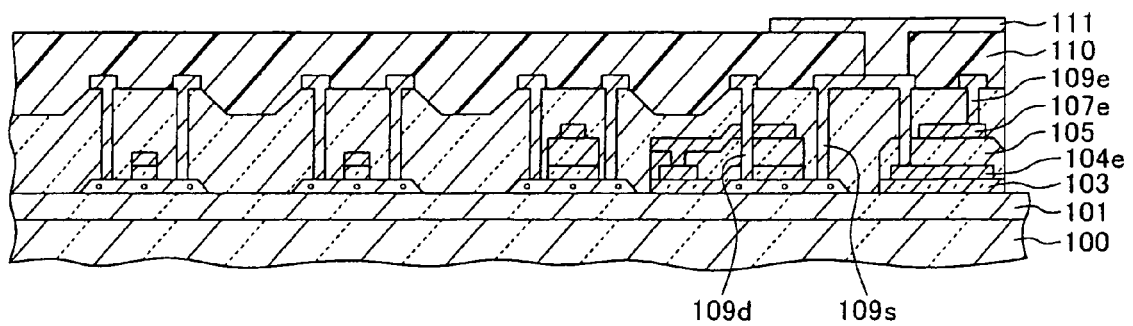

As shown in FIG. 5C, a second interlayer insulating film 110 and a pixel electrode 111 are formed in the manner similar to the above-described embodiments. In this embodiment, since the supplemental capacitor bus line is made of the same material as that of the data bus line, a low resistance supplemental capacitor bus line can be formed.

In the third embodiment, although the resistance of the supplemental capacitor bus line can be lowered, the capacitance of the supplemental capacitor is constituted of the portion between the lower and upper electrodes. The capacitance of the supplemental capacitor can be increased further.

FIGS. 7A to 7C and FIG. 8 are cross sectional views and a plan view illustrating the fourth embodiment capable of increasing the capacitance of the supplemental capacitor.

Figure 7A:
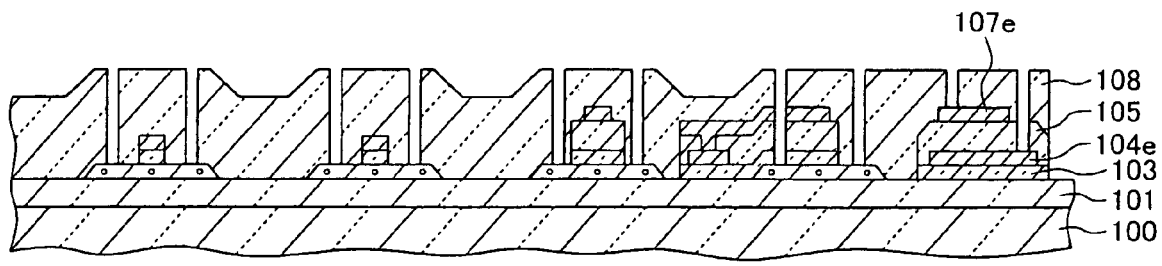
FIGS. 7A to 7C are cross sectional views illustrating main processes of a method of manufacturing a display device active matrix substrate according to a fourth embodiment of the present invention.

FIG. 7A shows the state corresponding to FIG. 5A. In this embodiment, the shapes of the lower electrode and upper electrode of the supplemental capacitor and the layout of the contact regions are different.

Figure 7B:
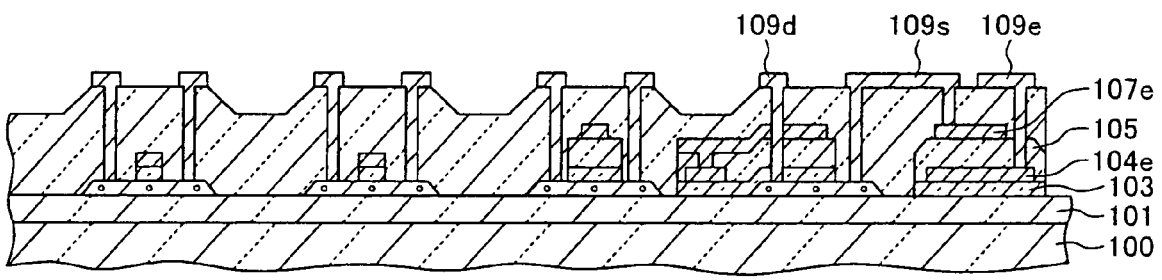

FIG. 7B shows the stage that forming an electrode/wiring layer is completed. In the supplemental capacitor area, an upper electrode 107e is disposed above a lower electrode 104e, similar to the above-described embodiments. A supplemental capacitor bus line 109e also serving as an electrode is disposed above the upper electrode 107e and electrically connected to the lower electrode 104e. The lower electrode 104e and bus line 109e sandwich the upper electrode 107e of the supplemental capacitor and extend along with the upper electrode so that the capacitance can be increased.

Figure 8:
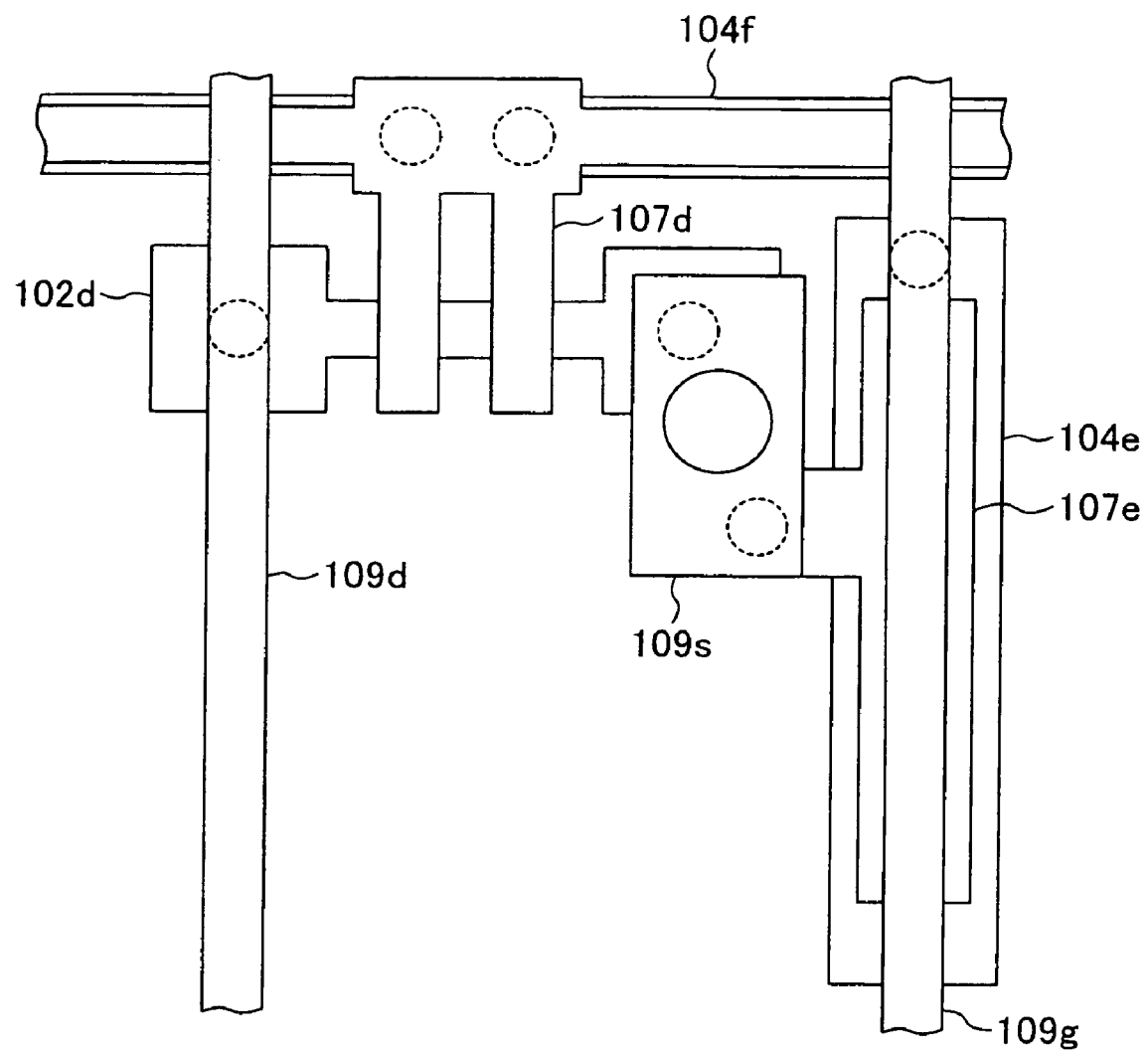
FIG. 8 is a schematic plan view showing the structure of a pixel of the display device active matrix substrate according to the fourth embodiment.

As shown in FIG. 8, the lower electrode 104e extends in the vertical direction, and the upper electrode 107e is formed above the lower electrode inside the plan shape of the lower electrode (narrower than the lower electrode). A portion of the upper electrode extends to the right, constituting the lead contact region. The supplemental capacitor bus line 109e is formed narrower than the upper electrode 107e and above the upper electrode 107e. The lamination electrode structure made gradually narrower toward the upper layer is effective for preventing breakage of an upper wiring at a step as described earlier.

Figure 7C:
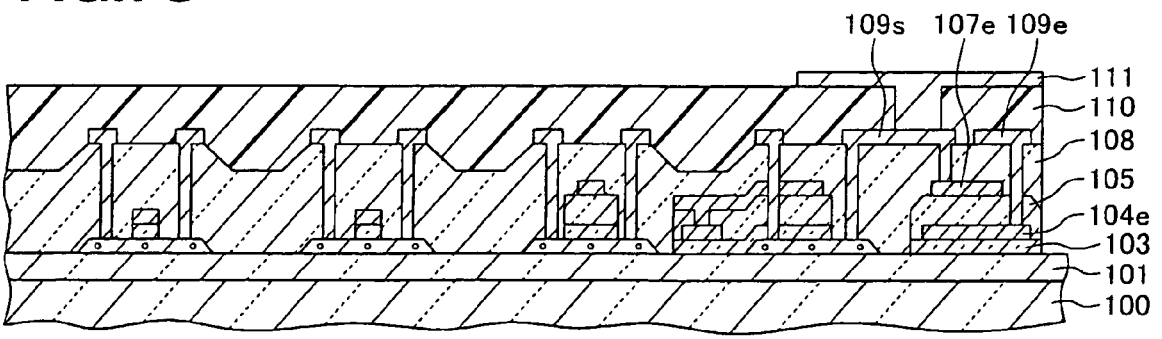

FIG. 7C shows the state that a second interlayer insulating film 110 is formed on a first interlayer insulating film 108 similar to the above-described embodiments and a pixel electrode 111 is formed. Also in this embodiment, not only the supplemental capacitor extends only in the vertical direction, but also at least a portion of the supplemental capacitor may extend in the lateral direction.

In the embodiments described above, the scanning gate wiring line (bus line) are formed by stacking two gate wiring layers and the two gate wiring layers are connected by forming a contact hole thorough the intermediate gate insulating layer (second gate insulating film). Therefore, it is necessary to use one mask and one etching process. An embodiment capable of simplifying this process will be described next.

Figure 9A:
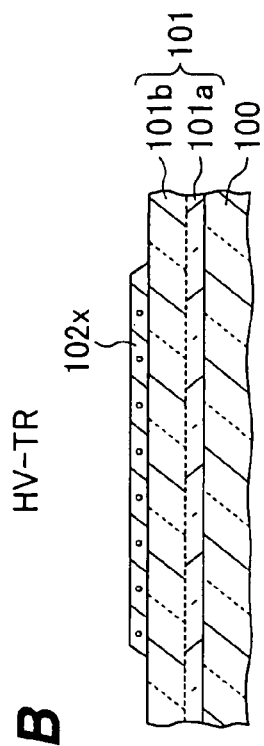
FIGS. 9A to 9F are cross sectional views and a plan view illustrating main processes of a method of manufacturing a display device active matrix substrate according to a fifth embodiment of the present invention.
Figure 9B:
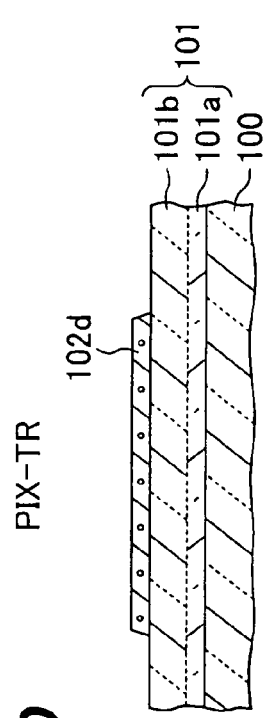
Figure 9C:
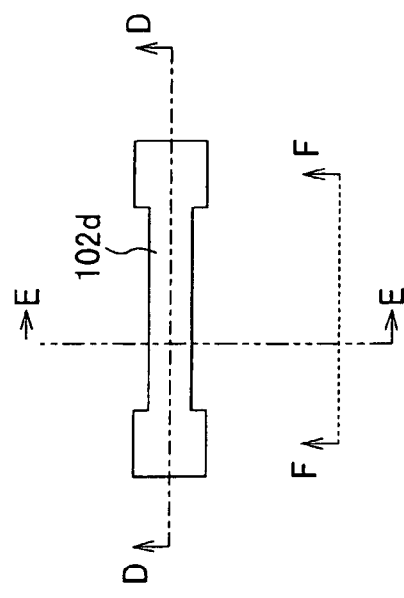
Figure 9D:
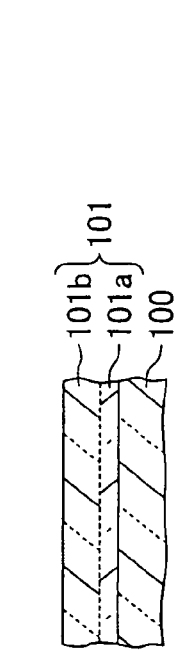
Figure 9E:
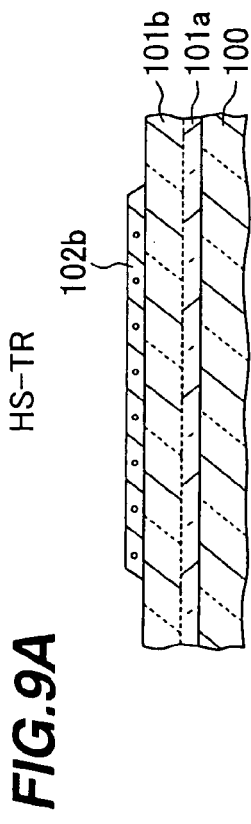
Figure 9F:

FIGS. 9A to 9F to FIGS. 14A to 14F are cross sectional views and plan views illustrating a method of manufacturing a display device active matrix substrate according to the fifth embodiment of the invention. In the display area, pixels are disposed in a matrix shape, and a plurality of scanning lines are disposed along the row direction, as shown in FIG. 22. FIG. 9A is a cross sectional view of a high speed operation transistor HS-TR made of a thin film TFT in a peripheral circuit, and FIG. 9B is a cross sectional view of a high breakdown voltage transistor HV-TR made of a thick film TFT in the peripheral circuit. FIG. 9C is a plan view showing a pixel transistor PIX-TR in the display area and a nearby scanning line area, and FIGS. 9D, 9E and 9F are cross sectional views taken along lines D-D, E-E and F-F shown in FIG. 9C. In FIGS. 10A to 10F to FIGS. 14A to 14F, characters A to F after a drawing number represent the similar meanings to those described above.

In FIGS. 9A to 9F, on the surface of a transparent insulating substrate 100 such as a glass substrate, an SiN film 101a of 50 nm in thickness and an $SiO_2$ film 101b of 200 nm in thickness are formed as the underlying layers by plasma enhanced (PE-) CVD. Thereafter, an amorphous silicon film 102 is grown on the $SiO_2$ layer 101b to a thickness of about 40 nm to 100 nm. An excimer laser beam of a solid state laser beam of a continuous wave is irradiated to the whole substrate surface or only the region to be crystallized, to thereby crystallize the amorphous silicon film. If annealing is performed at a temperature of about 450° C. to 550° C. before laser irradiation, the glass substrate will not be deformed greatly and it is possible to suppress abrasion to be caused by hydrogen during laser irradiation.

After the silicon film 102 is polycrystallized, the silicon film 102 is patterned in an island shape. For example, a photoresist pattern is formed on the silicon film 102, and by using the photoresist pattern as a mask, the silicon film is patterned into an island silicon film for each transistor through dry etching using fluorine-containing gas. The photoresist pattern is thereafter removed. As shown in FIGS. 9A, 9B and 9C to 9E, an island silicon film 102b for a high speed transistor, an island silicon film 102x for a high breakdown transistor and an island silicon film 102d for a pixel transistor are therefore formed.

FIGS. 10A to 10F illustrate a process of forming a high speed operation transistor gate insulating film, covering the silicon film 102 patterned in an island shape. For example, an $SiO_2$ film 103 of 30 nm in thickness is formed as the first gate insulating film by PE-CVD, and an Mo layer 104 of 300 nm in thickness is formed on the $SiO_2$ film as the first gate electrode layer. A photoresist pattern is formed on the Mo film 104. By using the photoresist pattern as a mask, the Mo film is dry-etched by using fluorine containing gas or wet-etched by using phosphorus-nitric acid containing etchant, to form a first gate electrode 104b and a lower scanning line 104sl. The photoresist pattern is thereafter removed.

As shown in FIG. 10A, in the high speed transistor area in the peripheral circuit, the first gate electrode 104b is formed. As shown in FIGS. 10B and 10D, in another transistor area, the Mo film 104 is etched and removed. As shown in FIGS. 10C, 10E and 10F, in the display area, along the pixel transistor PIX-TR disposed in the lateral (row) direction, the lower scanning line 104sl extending in the lateral (row) direction is formed. The lower scanning line 104sl includes a portion 104f extending in the row direction and functioning as the scanning line and a contact protrusion portion 104p protruding sideward (downward in FIG. 10C) from the extending direction and functioning as the interconnect portion.

FIGS. 11A to 11F show the state that a second gate insulating film and a second gate electrode layer are formed on the substrate, covering the first gate electrode and lower scanning line, and the second gate electrode layer is patterned. For example, an $SiO_2$ film 105 of 80 nm in thickness is formed as the second gate insulating film by PE-CVD, and on this $SiO_2$ film an Mo layer 107 of 300 nm in thickness is formed by sputtering. On the Mo layer a photoresist pattern having a pattern of a high breakdown voltage TFT gate electrode and an upper scanning line is formed to etch the Mo film 107. Etching may be wet-etching or dry-etching by using phosphorus-nitric acid containing etchant, as described above. The photoresist pattern is thereafter removed.

Figure 11A:
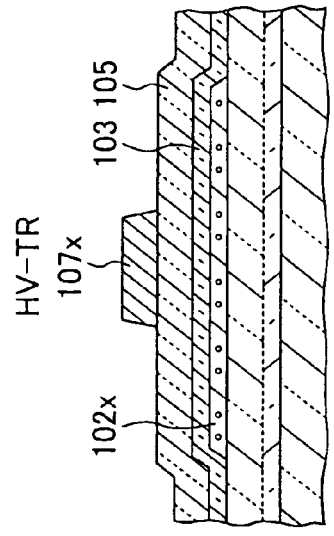
FIGS. 11A to 11F are cross sectional views and a plan view illustrating main processes the method of manufacturing a display device active matrix substrate according to the fifth embodiment.
Figure 11B:
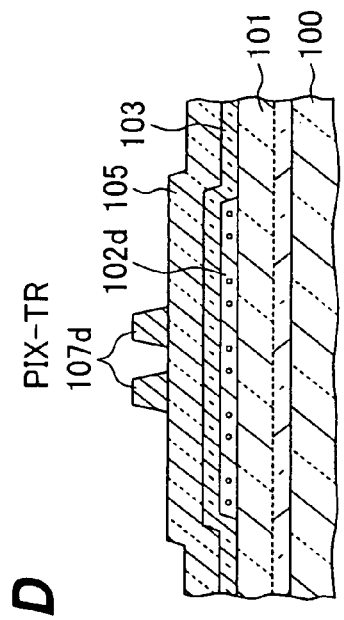
Figure 11C:
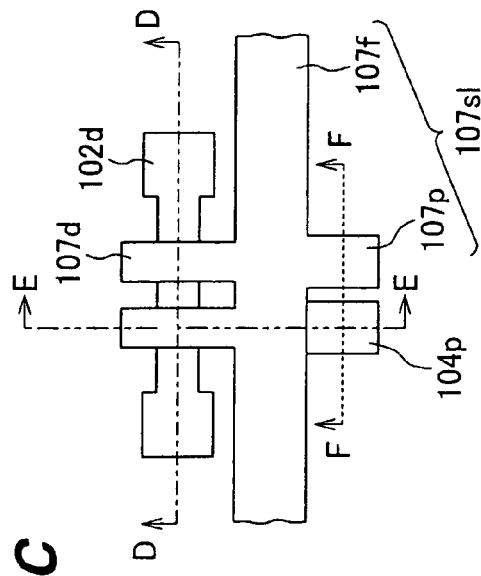
Figure 11D:
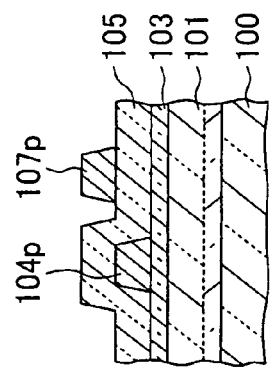
Figure 11E:
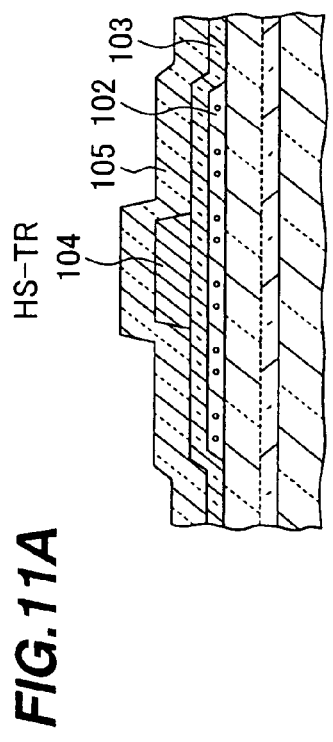
Figure 11F:
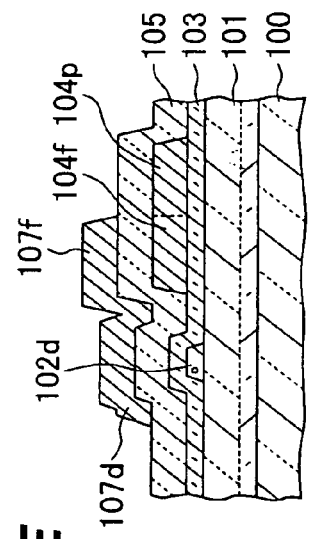

As shown in FIGS. 11B and 11D, a gate electrode 107x of the high breakdown voltage transistor HV-TR of the peripheral circuit and the double-gate 107d of the pixel transistor PIX-TR are therefore formed. As shown in FIGS. 11C, 11E and 11F, the upper scanning line 107sl is formed above the lower scanning line 104sl.

As shown in FIG. 11C, similar to the lower scanning line, the upper scanning line 107s1 includes a portion 107f extending in the row direction and functioning as the scanning line and a contact protrusion portion 107p protruding sideward from the extending direction and functioning as the interconnect portion. The protrusion portion 104p of the lower scanning line and the protrusion portion 107p of the upper scanning line are disposed side by side at a short distance in a downward area of the scanning lines. In this state, the upper scanning line 107sl and lower scanning line 104sl are electrically separated. The double gate electrode 107d extends above the silicon film 102d continuously with the upper scanning line 107sl.

FIGS. 12A to 12F illustrate a process of patterning the second gate insulating film and implanting ions into source/drain regions. As shown in FIG. 12A, for the high speed operation transistor HS-TR, the second gate insulating film 105 is etched and thereafter the first gate insulating film 103 is patterned by using the gate electrode 104 as a mask.

As shown in FIGS. 12B and 12D, for the high breakdown voltage transistor HV-TR and pixel transistor PIX-R, the gate insulating films 105 and 103 having the region protruding from the gate electrodes 107x and 107d are patterned. The photoresist mask is thereafter removed.

For an n-channel transistor, n-type impurities, e.g., P ions are implanted into the source/drain regions. Ion implantation for forming high concentration source/drain regions is performed. In addition, ion implantation for forming LDD regions in the high breakdown voltage transistor HV-TR and pixel transistor PIX-TR is performed which allows ions to be implanted into the silicon film under the gate insulating film. For example, $P^+$ ions are implanted at an acceleration energy of 10 keV and a dose of $1 \times 10^{15}$ $cm^{-2}$, and then at an acceleration energy of 90 keV and a dose of $1 \times 10^{14}$ $cm^{-2}$. The ion implantation at the high acceleration energy allows impurity ions to pass through the gate insulating films 105 and 103 and be implanted into the underlying silicon film. In this manner, a thin film transistor without LDD is formed as the high speed operation transistor HS-TR, and a thin film transistor with the LDD regions under the gate insulating film protruded from the gate electrode as the high breakdown voltage transistor HV-TR and pixel transistor PIX-TR.

FIGS. 13A to 13F illustrate a process of forming a first interlayer insulating film covering the formed thin film transistors, forming contact holes and forming an electrode layer on the first interlayer insulating film. For example, an $SiO_2$ film of 60 nm in thickness is formed by PE-CVD as the interlayer insulating film 108, and an SiN film of 370 nm in thickness is formed on the $SiO_2$ film. On the interlayer insulating film 108, a resist pattern having openings corresponding to contact holes is formed on the interlayer insulating film 108. The SiN film and SiO$_2$ film are dry-etched by using fluorine containing gas. The resist pattern is thereafter removed. An Ti film of 50 nm in thickness, an Al film of 200 nm in thickness and a Ti film of 100 nm in thickness are formed by sputtering to form a source/drain electrode layer 109. A resist pattern having an electrode/wiring pattern is formed on the source/drain electrode layer to etch the source/drain electrode layer. An unnecessary electrode layer is dry-etched and removed by using chlorine containing etchant. The resist pattern is thereafter removed.

Figure 13B:
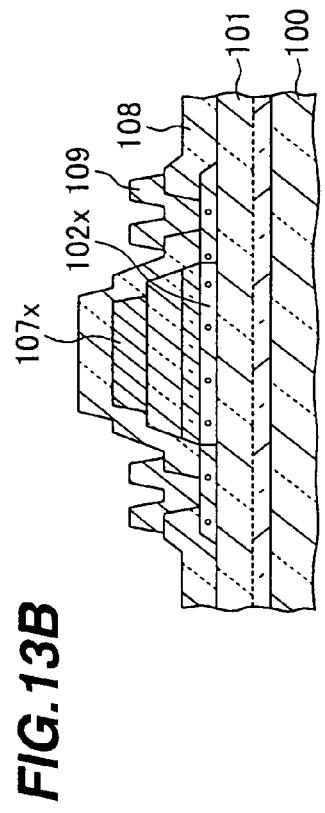
FIGS. 13A to 13F are cross sectional views and a plan view illustrating main processes of the method of manufacturing a display device active matrix substrate according to the fifth embodiment.
Figure 13D:
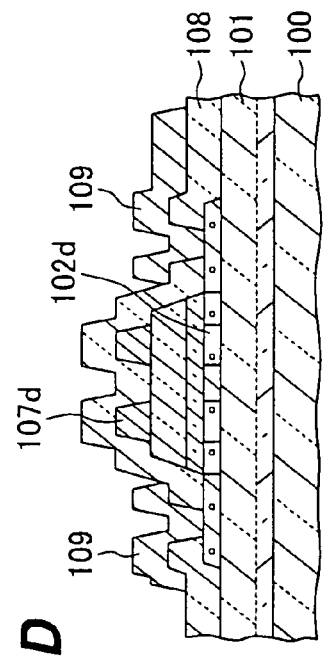
Figure 13F:
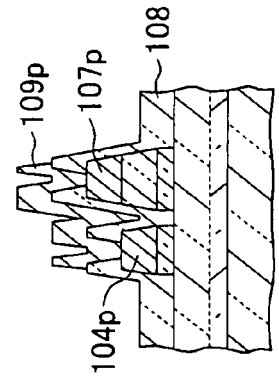
Figure 13A:
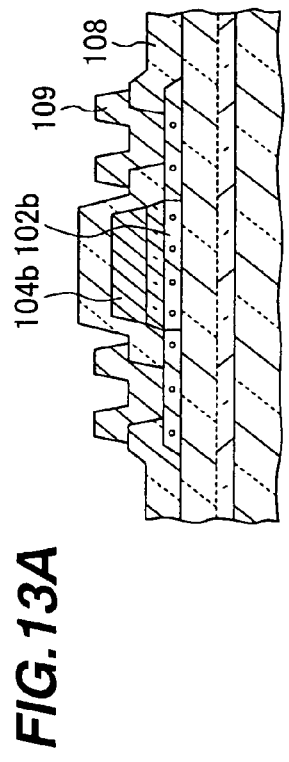

As shown in FIGS. 13A, 13B and 13D, source/drain electrodes 109 are therefore formed on the source/drain regions of each thin film transistor.

Figure 13C:
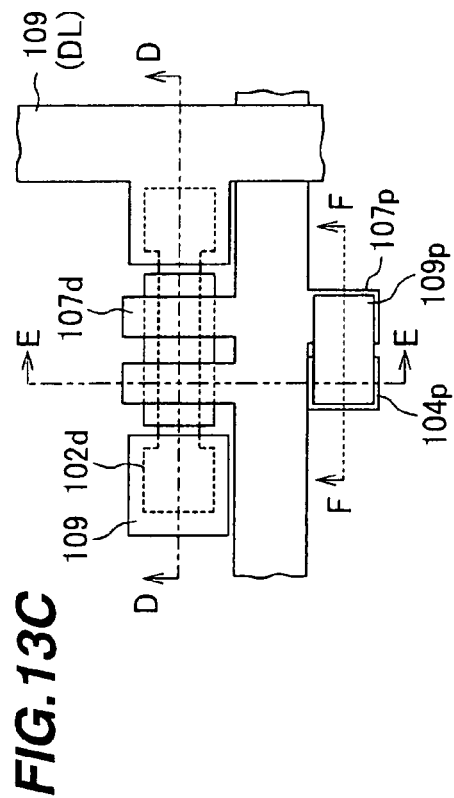

As shown in FIG. 13C a drain line DL is formed continuously with the drain electrodes of pixel transistors disposed in the column (vertical direction).

Figure 13E:
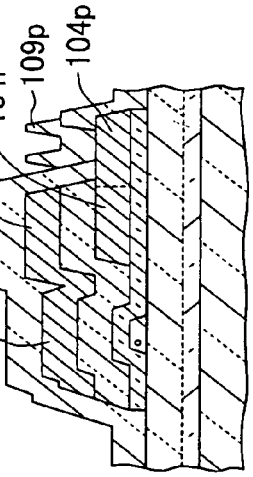
Figure 16A:
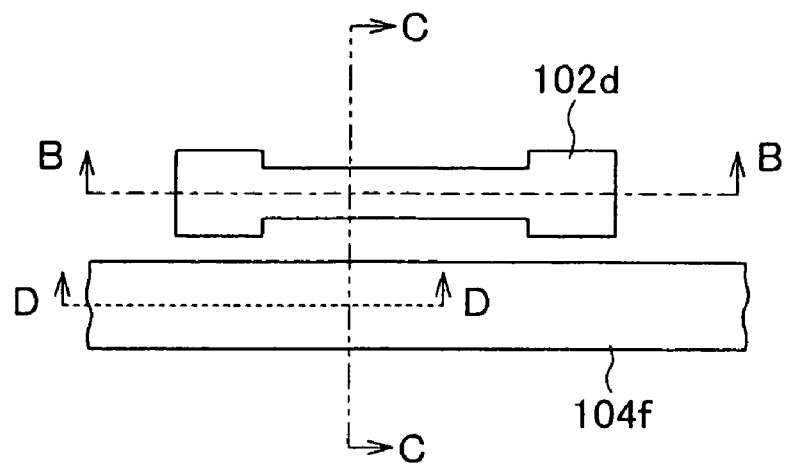
FIGS. 16A to 16D are cross sectional views and a plan view illustrating main processes of a method of manufacturing a display device active matrix substrate according to a sixth embodiment of the present invention.
Figure 16B:
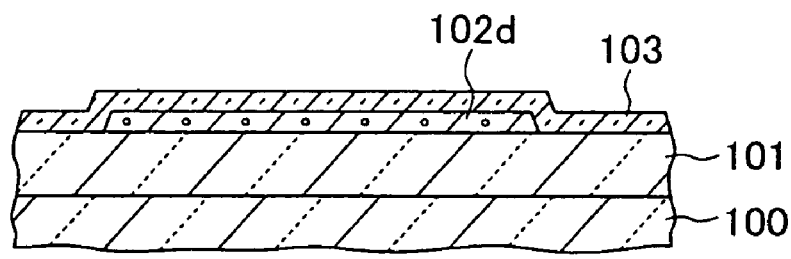
Figure 16C:
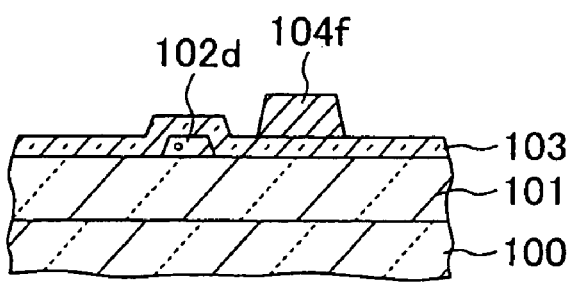
Figure 16D:
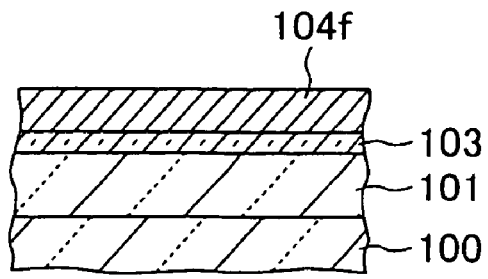

As shown in FIGS. 13C, 13E and 13F, in the scanning line area, a local wiring line 109$p$ is formed for interconnecting the protruded regions 104$p$ and 107$p$. In this manner, the lower scanning line 104$sl$ and upper scanning line 107$sl$ are electrically connected and the scanning line of the lamination structure is formed.

FIGS. 14A to 14F illustrate a process of forming a second interlayer insulating film covering the source/drain electrodes, opening a pixel electrode contact hole and forming a pixel electrode. For example, a photosensitive transparent organic insulating film 110 is coated covering the patterned electrode 109, exposed and developed to open the contact hole.

As shown in FIG. 14D, an opening is formed above the source electrode 109 of the pixel transistor PIX-TR. As shown in FIGS. 14A and 14B, in the peripheral circuit area, openings are not required to be formed, because it is almost unnecessary to form a transparent electrode. However, if inspection terminals are to be formed for inspecting the circuit operation after thin film transistors are formed, the peripheral region of the inspection terminal is opened.

As shown in FIG. 14D, an ITO film 111 of 70 nm in thickness is formed, for example, by sputtering, covering the inside of the opening. A resist pattern is formed on the ITO film to wet-etch and pattern the ITO film 111 by using ITO etcher. In this manner, the pixel electrode of each pixel is formed.

According to this embodiment, it is not necessary to use an additional mask process for forming a contact hole through the second gate insulating film. The contact hole for the scanning line can be formed at the same time when contact holes are formed for the source/drain regions of transistors. In this manner, one mask and one etching process can be dispensed with.

FIGS. 15A to 15C illustrate a modification wherein the supplemental capacitor is formed at the same time when the scanning lines are formed. FIG. 15A is a plan view and FIGS. 15B and 15C are cross sectional views taken along lines B-B and C-C shown in FIG. 15A.

FIG. 15A shows the structure that the scanning lines of the above-described embodiments are formed below the pixel transistor shown in FIG. 15A, and the supplemental capacitor and supplemental capacitor bus line are formed above the pixel transistor. An island silicon film 104$e$ for the supplemental capacitor is formed continuously with an island silicon film 102$d$ for the pixel transistor.

As shown in FIG. 15B, at the same time when two scanning layers are formed, two supplemental capacitor electrodes 104$e$ and 107$e$ also serving as the supplemental capacitor bus line are formed above the supplemental capacitor island silicon film 102$e$.

As shown in FIG. 15A, similar to the scanning lines, the supplemental capacitor bus lines have contact protrusion regions 104$q$ and 107$q$ protruding sideward (upward in FIG. 15A) in FIG. 10C) from the extending direction.

As shown in FIGS. 15A and 15C, a supplemental capacitor local wiring line 109$q$ is formed at the same time when the source/drain electrodes are formed. The supplemental capacitor local wring line interconnects the contact protrusion regions 104$q$ and 107$q$ of the two supplemental capacitor bus lines.

According to the fifth embodiment, it is possible to omit the mask and etching processes for interconnecting two scanning line layers. It is necessary to reserve the area where the contact projection regions are formed so that the aperture ratio of the display area is lowered. It is also possible to simplify the processes while the aperture ratio is prevented from being lowered.

FIGS. 16A to 16D to FIGS. 19A to 19D illustrate a method of manufacturing a display device active matrix substrate according to the sixth embodiment of the present invention. In each drawing, Figs. with a suffix A are plan views, and Figs. with suffixes B, C and D are cross sectional views taken along lines B-B, C-C and D-D shown in Figs. with the suffix A.

As shown in FIGS. 16A to 16D, similar to the above-described embodiments, on a transparent insulating substrate 100 such as a glass substrate, a buffer insulating layer 101 is formed and thereafter an island silicon film 102 is formed. A first gate insulating film 104 is formed covering the island silicon film 102 and a first gate insulating film 104 is formed. The first gate insulating film 104 is patterned to form a gate electrode of a high speed operation transistor and a lower scanning line 104$f$ in the pixel area.

Figure 17A:
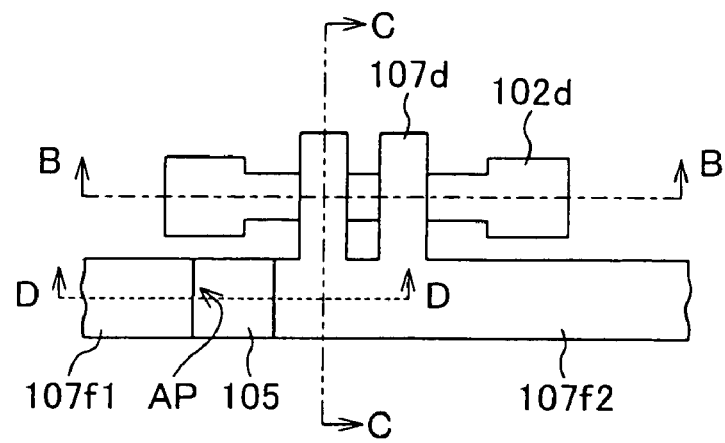
FIGS. 17A to 17D are cross sectional views and a plan view illustrating main processes of the method of manufacturing a display device active matrix substrate according to the sixth embodiment.
Figure 17B:
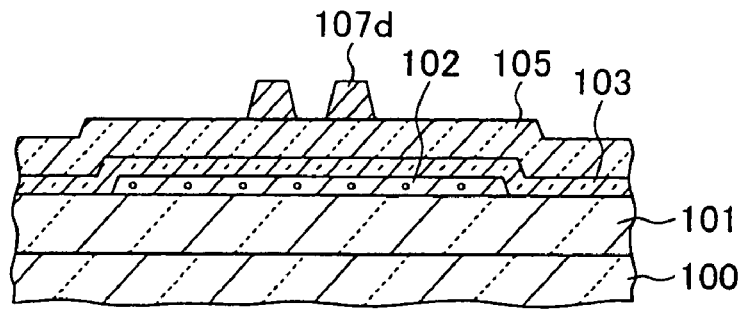
Figure 17C:
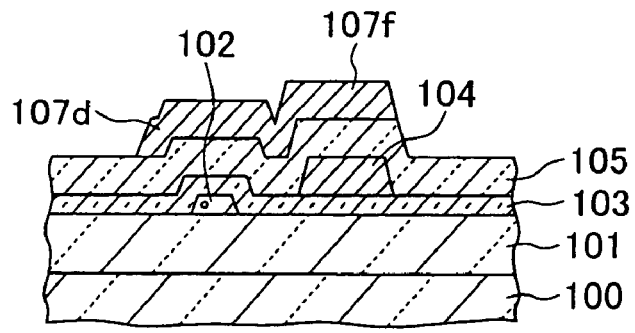
Figure 17D:
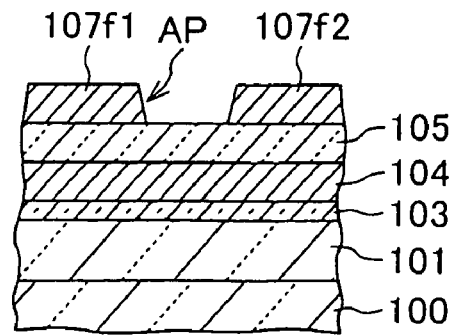

FIGS. 17A to 17D illustrate a process of forming a second gate insulating film of the pixel transistor and thereafter forming a gate electrode and an upper scanning line. Although these processes are similar to the above-described embodiments, as shown in FIGS. 17A and 17D a different point resides in that the upper scanning line is constituted of regions 107$f$1 and 107$f$2 (collectively represented by 107$f$) separated to the right and left regions by an opening AP. In the opening AP, the second gate insulating film 105 is exposed and the lower scanning line 104 is disposed under the second gate insulating film. Namely, the opening AP defines the contact area of the lower scanning line 104$f$, and the contact areas of the upper scanning lines 107$f$1 and 107$f$2 are defined on both sides of the opening AP.

FIGS. 18A to 18D illustrate a process of forming a first interlayer insulating film 108 covering the gate electrode and thereafter forming contact holes.

Figure 18A:
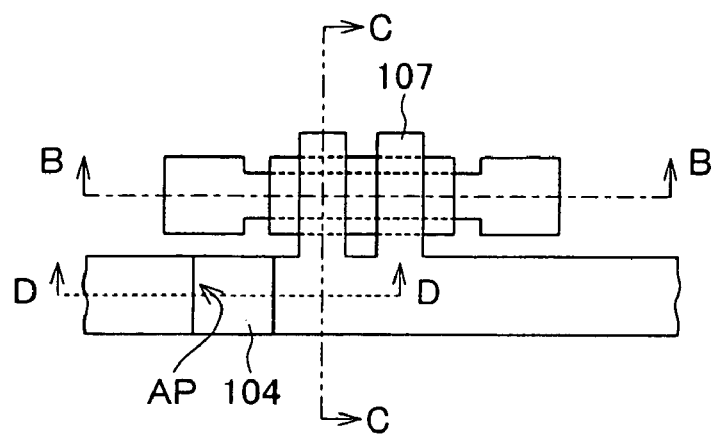
FIGS. 18A to 18D are cross sectional views and a plan view illustrating main processes of the method of manufacturing a display device active matrix substrate according to the sixth embodiment.
Figure 18B:
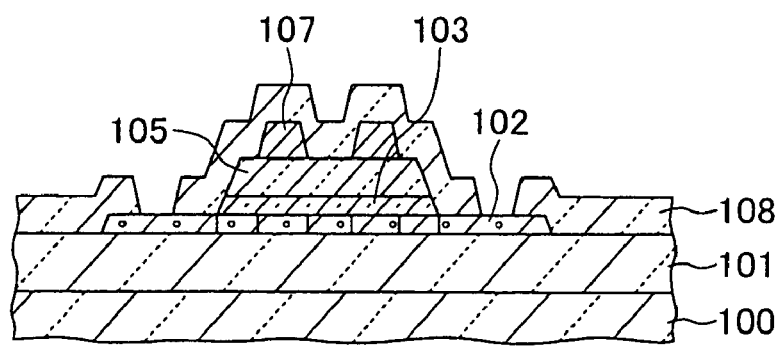
Figure 18C:
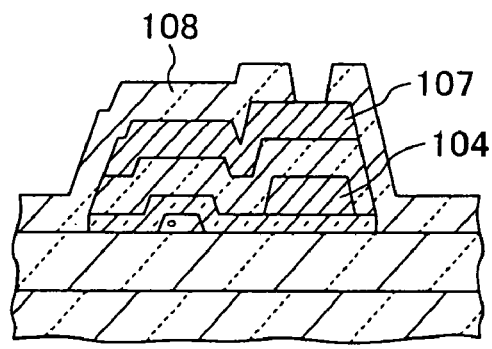

As shown in FIG. 18B, contact holes exposing the source/drain regions of the pixel transistor are etched through the interlayer insulating film 108.

Figure 18D:
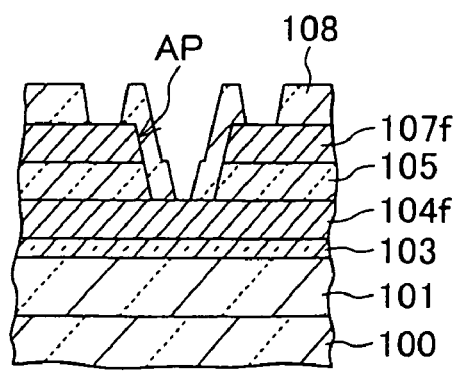

As shown in FIG. 18D, at the same time, contact holes exposing the upper scanning lines 107$f$1 and 107$f$2 on both sides of the opening AP and a contact hole exposing the lower scanning line 104$f$ in the opening are formed.

Figure 19A:
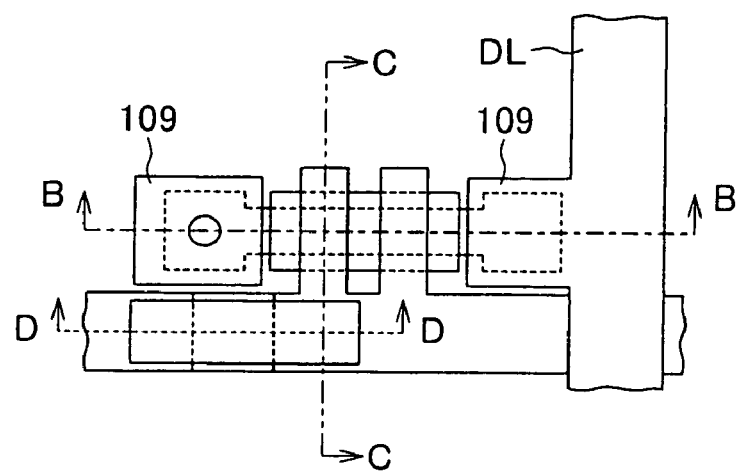
FIGS. 19A to 19D are cross sectional views and a plan view illustrating main processes of the method of manufacturing a display device active matrix substrate according to the sixth embodiment.
Figure 19B:
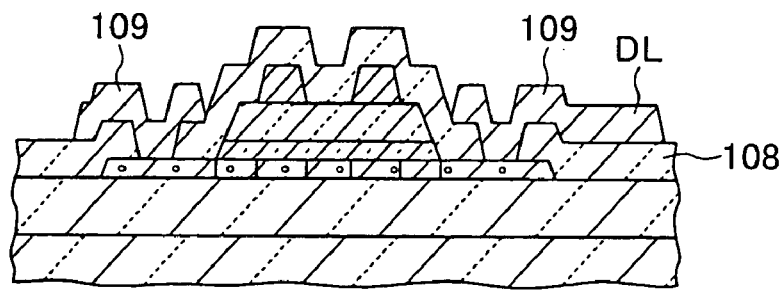

FIGS. 19A to 19D illustrate a process of forming a source/drain electrode layer. As shown in FIGS. 19A and 19B, in the pixel transistor area, source/drain electrodes 109 contacting the source/drain regions and an image data wiring line DL are formed.

Figure 19C:
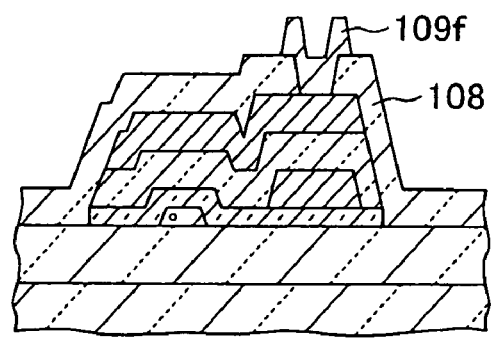
Figure 19D:
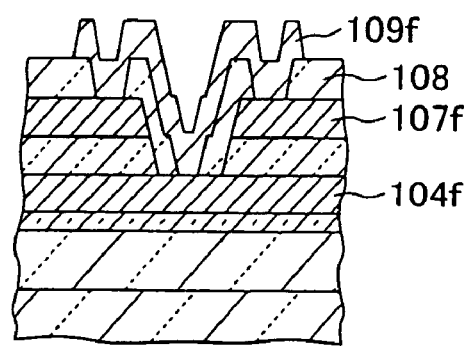

As shown in FIGS. 19C and 19D, at the same time when the source/drain electrodes are formed, a local wiring line 109$f$ for interconnecting the lower scanning line 104$f$ and upper scanning line 107$f$ is formed. The local wiring line 109$f$ electrically connects the separated upper scanning lines 107$f$1 and 107$f$2 and also connects the upper scanning line 107$f$2 and lower scanning line 104f. The laminated wiring lines can be connected without using a wiring area and a contact area.

Figure 20A:
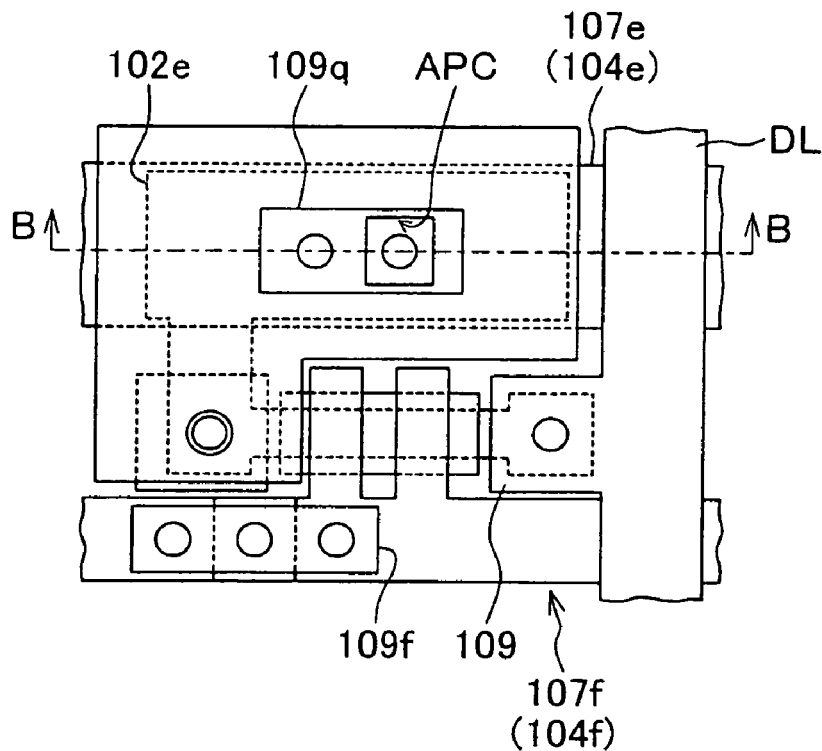
FIGS. 20A and 20B are a plan view and a cross sectional view showing a modification of the sixth embodiment.
Figure 20B:
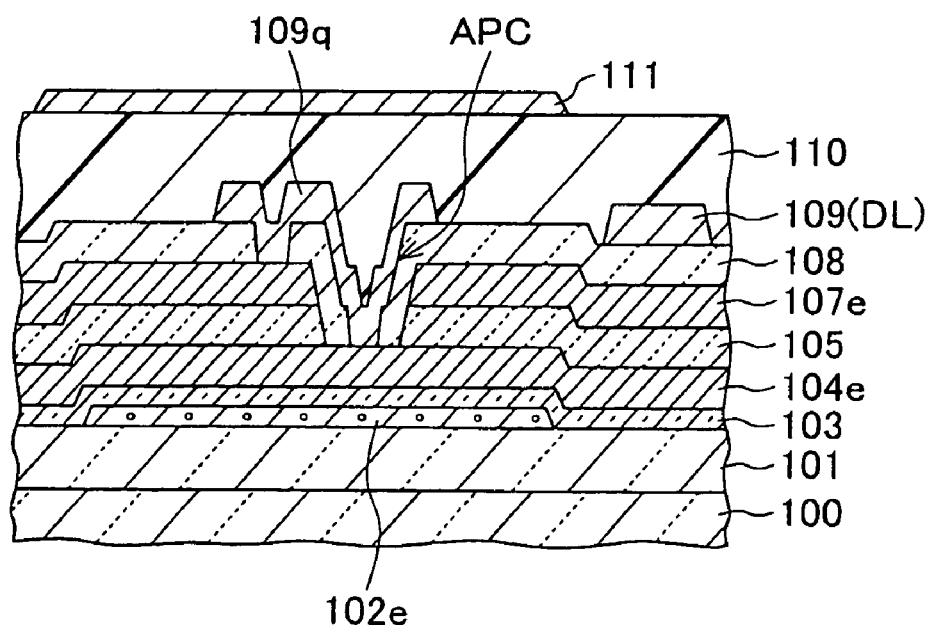

FIGS. 20A and 20B show a modification of the sixth embodiment. FIG. 20a is a plan view and FIG. 20B is a cross sectional view taken along line B-B shown in FIG. 20A. Similar to FIGS. 15A to 15C, the supplemental capacitor bus line is formed at the same time when the scanning line is formed.

As shown in FIG. 20A, the lower scanning line 104f and upper scanning line 107f are interconnected by the local wiring line 109f, similar to the above-described embodiment. In the supplemental capacitor area, a supplemental capacitor island silicon film 102e is formed continuously with a pixel transistor island silicon film 102d. Above the supplemental capacitor island silicon film 102e, a supplemental capacitor lower bus line 104e is formed at the same time when the lower scanning line is formed, and a supplemental capacitor upper bus line 107e is formed at the same time when the upper scanning line is formed. These bus lines also function as the upper electrode of the supplemental capacitor.

As shown in FIG. 20A, the supplemental capacitor upper bus line 107e has an opening APC formed by removing the central area in its width direction. This opening APC defines the contact area of the supplemental capacitor lower bus line, and the areas of the supplemental capacitor upper bus line near the opening APC define contact areas of the supplemental capacitor upper bus line.

As shown in FIG. 20B, an interlayer insulating film 108 is formed covering the supplemental capacitor upper bus line 107e, and contact holes are formed by using a resist pattern as a mask. The source/drain regions of the transistor, the contact regions of the supplemental capacitor and the contact region of the scanning line are exposed in the contact holes.

As shown in FIG. 20A, a contact hole exposing the supplemental capacitor lower bus line 104e is formed and a contact hole exposing the supplemental capacitor upper bus line 107e is formed near the contact hole exposing the supplemental capacitor lower bus line. After the contact holes are formed, a source/drain electrode layer is deposited and patterned by using a resist pattern as a mask. Source/drain electrodes are therefore formed and a local wiring line 109f for interconnecting the upper and lower scanning lines are formed. As the same time, a supplemental capacitor local wiring line 109q for interconnecting the upper and lower supplemental capacitor bus lines is formed. The upper and lower two conductive layers can therefore be connected to another conductive layer to be formed above the two conductive layers without forming contact projection regions.

In the supplemental capacitor bus line, a central region of the upper bus line along its width direction is opened and a contact hole reaching the supplemental capacitor lower bus line is formed in this opening. This structure may be adopted for the scanning line. The structure that the upper scanning line is separated by an opening and contact holes of the upper scanning line are formed on both sides of the opening, may be adopted for the supplemental capacitor bus line.

In the above-described embodiments, circuits to be formed in the peripheral circuit area can be configured in various ways depending on designs. The structure of each TFT can be changed in various ways. Display devices can be manufactured by using active matrix substrates described above.

Figure 21A:
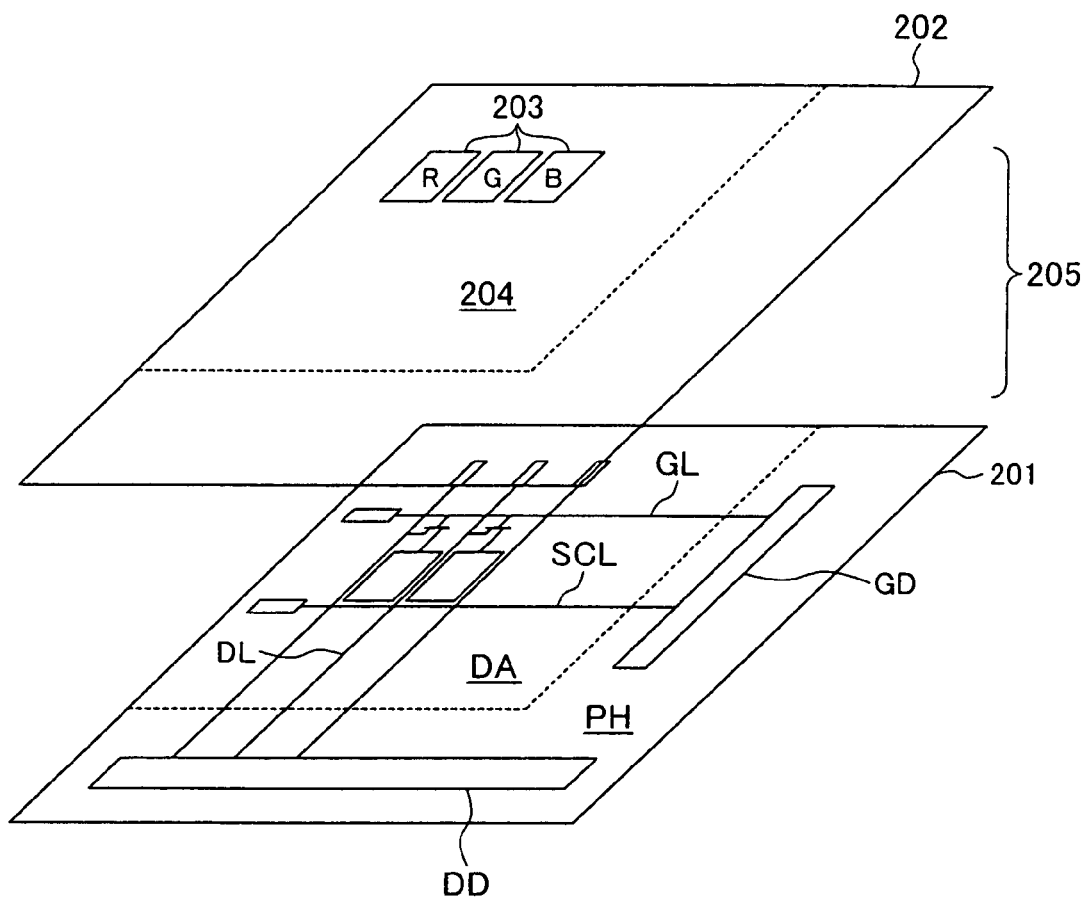
FIGS. 21A and 21B are a perspective view and a cross sectional view schematically showing the structure of a display device.

FIG. 21A shows an example of the structure of a liquid crystal display device. An active matrix substrate 201 has a display area DA and a peripheral circuit area PH. In the display area DA, scanning gate wiring lines DL, supplemental capacitor bus lines SCL, data wiring lines DL and pixel structures are formed. In the peripheral circuit area PH, a gate driver GD and a data driver DD are formed. On an opposing substrate 202, color filters 203 in the area corresponding to the pixel area and a common electrode 204 common to all pixels are formed. A liquid crystal layer 205 is filled in between the color filter substrate 202 and active matrix substrate 201.

Figure 21B:
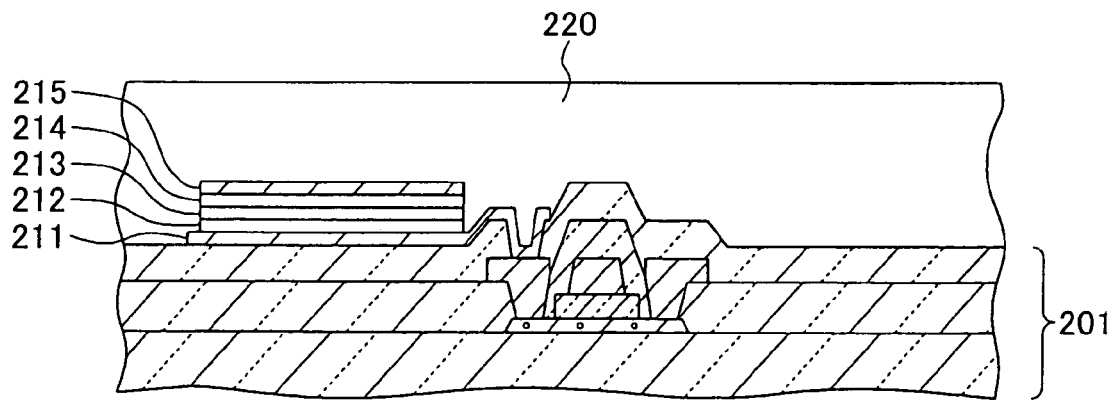

FIG. 21B shows an example of the structure of an organic EL panel. Similar to the above-described embodiments, an active matrix substrate 201 has scanning gate wiring lines, data wiring lines, thin film TFTs and the like formed on the glass substrate. In each pixel area, the source of TFT is connected to an anode 211 made of, for example, ITO. Laminated on this anode 211 are a hole transport layer 212, a light emitting layer 213, an electron transport layer 214 and a cathode 215 made of aluminum or the like, to constitute an organic EL element structure. Light emitted from the organic EL element propagates downward and is output from the glass substrate of the active matrix substrate 201 to an external. The upper portion of the organic EL element is covered with a sealing member 220.

The present invention has been described in connection with the preferred embodiments. The invention is not limited only to the above embodiments. For example, various combinations of the embodiments are possible, for example, the supplemental capacitor island semiconductor layer of the fifth and sixth embodiments may be used as the supplemental capacitor island semiconductor layer and connection conductive layer of the first embodiment. The materials, thicknesses and the like described in the specification are only illustrative and they may be changed in various ways depending upon designs. It will be apparent to those skilled in the art that other various modifications, improvements, combinations, and the like can be made.

What we claimed is:

1. A display device active matrix substrate comprising:
   an insulating substrate having a display area where pixels are disposed in a matrix shape and a peripheral circuit area disposed in a peripheral area of said display area where peripheral circuits are formed;
   a plurality of scanning lines formed in said display area along a row direction;
   a plurality of image data lines formed in said display area along a column direction, said image data lines defining a plurality of pixel areas together with said scanning lines;
   a pixel transistor island semiconductor layer formed in said display area near at each cross point between said scanning line and said image data line, and a plurality of peripheral circuit transistor island semiconductor layers formed in said peripheral circuit area;
   a gate insulating film for a pixel, having a first thickness and covering a middle position of each of said pixel transistor island semiconductor layers;
   a first gate electrode made of a first wiring line disposed on said first gate insulating film for a pixel above and overlapping said pixel transistor island semiconductor layers;
   a gate insulating film for a peripheral circuit, having a second thickness thinner than said first thickness and covering a middle position of each of part of said peripheral circuit transistor island semiconductor layers; and
   a second gate electrode made of a second wiring line and disposed on said gate insulating film for a peripheral circuit,
   wherein said pixel transistor island semiconductor layer, said gate insulating film for a pixel and said first gate electrode constitute a pixel transistor, and said scanning line includes a lower scanning wiring line made of said second wiring line and an upper scanning wiring line made of said first wiring line, formed above said lower scanning wiring line and extending across at least one of said plurality of image data lines, said upper scanning wiring line being connected to said lower scanning wiring line, wherein said gate insulating film for a pixel includes a lower first gate insulating film made of a same layer as said gate insulating film for a peripheral circuit and an upper gate insulating film formed on said lower first gate insulating film, and wherein an intermediate insulating layer made of a same layer as said upper second gate insulating film is disposed covering said lower scanning wiring line, an intermediate contact hole is formed through said intermediate insulating layer, and said upper scanning wiring line is formed on said intermediate insulating layer, and connected to said lower scanning wiring line via said intermediate contact hole.

2. The display device active matrix substrate according to claim 1, further comprising:

first source/drain regions formed in each of said pixel transistor island semiconductor layers on both sides of said first gate electrode;

second source/drain regions formed in said part of the peripheral circuit transistor island semiconductor layers on both sides of said second gate electrode;

an interlayer insulating film formed above said insulating substrate and covering said first and second gate electrodes and said upper scanning wiring line;

a plurality of contact holes formed through said interlayer insulating film and reaching at least said first and second source/drain regions; and a conductive layer filled in said contact holes and extending on said interlayer insulating film.

3. The display device active matrix substrate according to claim 2, wherein said lower scanning wiring line and said upper scanning wiring line each have a contact projection region projecting sideward from an elongated direction, said plurality of contact holes include scanning wiring line contact holes reaching said contact projection regions, and said conductive layer includes a local wiring line for interconnecting said lower scanning wiring line and said upper scanning wiring line via said scanning wiring line contact holes.

4. The display device active matrix substrate according to claim 2, wherein said lower scanning wiring line includes a lower contact region in an elongated direction area, said upper scanning wiring line has an opening above said lower contact region and has an upper contact region near the opening, said plurality of contact holes include scanning wiring line contact holes reaching said lower and upper contact regions, and said conductive layer includes a local wiring line for interconnecting said lower scanning wiring line and said upper scanning wiring line via said scanning wiring contact holes.

5. The display device active matrix substrate according to claim 4, wherein said opening of said upper scanning wiring line divides said upper scanning wiring line, said upper contact region is formed on each side of said opening, and said local wiring line also connects the divided upper scanning wiring line.

6. The display device active matrix substrate according to claim 1, wherein said first and second wiring lines are made of refractory metal.

7. The display device active matrix substrate according to claim 1, further comprising:

a display electrode connected to said pixel transistor; and a supplemental capacitor whose one electrode is connected to said display electrode, respectively formed in each pixel area, wherein the one electrode of said supplemental capacitor is made of a same semiconductor layer as said pixel transistor island semiconductor layer, and the other electrode of said supplemental capacitor includes a lower supplemental capacitor bus line made of said second wiring line and an upper supplemental capacitor bus line formed above said lower supplemental capacitor bus line, made of said first wiring line and connected to said lower supplemental capacitor bus line.

8. The display device active matrix substrate according to claim 7, wherein a semiconductor layer of said supplemental capacitor is a semiconductor layer continuous with said pixel transistor island semiconductor layer.

9. The display device active matrix substrate according to claim 7, further comprising:

an intermediate insulating layer made of a same layer as said upper gate insulting film is disposed covering said lower supplemental capacitor bus line; and an intermediate contact hole formed through said intermediate insulating layer, wherein said upper supplemental capacitor bus line is formed on said intermediate insulating layer, and connected to said lower supplemental capacitor bus line via said intermediate contact hole.

10. The display device active matrix substrate according to claim 7, wherein said lower supplemental capacitor bus line and said upper supplemental capacitor bus line each have a contact projection region projecting sideward from an extension direction, said plurality of contact holes include supplemental capacitor bus line contact holes reaching said contact projection regions, and said conductive layer includes a local wiring line for interconnecting said lower supplemental capacitor bus line and said upper supplemental capacitor bus line via said supplemental capacitor bus line contact holes.

11. The display device active matrix substrate according to claim 7, wherein said lower supplemental capacitor bus line includes a lower contact region in an elongated direction, said upper supplemental capacitor bus line has an opening above said lower contact region and has an upper contact region near the opening, said plurality of contact holes include supplemental capacitor bus line contact holes reaching said lower and upper contact regions, and said conductive layer includes a local wiring line for interconnecting said lower supplemental capacitor bus line and said upper supplemental capacitor bus line via said supplemental capacitor bus line contact holes.

12. The display device active matrix substrate according to claim 11, wherein said opening of said upper supplemental capacitor bus line divides said upper supplemental capacitor bus line, said upper contact region is formed on each side of said opening, and said local wiring line also connects the divided upper supplemental capacitor bus line.

13. The display device active matrix substrate according to claim 2, further comprising:

a display electrode connected to said pixel transistor; and a supplemental capacitor having first and second electrodes made of said first and second wiring lines, one of said first and second electrodes being connected to said display electrode, respectively formed in each pixel area.

14. The display device active matrix substrate according to claim 13, wherein said second electrode of said supplemental capacitor is formed below said first electrode and made broader than said first electrode.

15. The display device active matrix substrate according to claim 13, further comprising a supplemental capacitor bus line connected to the other of said first and second electrodes of said supplemental capacitor and made of a same wiring line as said image data line.

16. The display device active matrix substrate according to claim 15, wherein said supplemental capacitor bus line extends in the column direction.

17. The display device active matrix substrate according to claim 15, wherein said second electrode, said first electrode and said supplemental capacitor bus line are stacked with insulating layer being interposed, and said first electrode is wider than said supplemental capacitor bus line.

18. The display device active matrix substrate according to claim 3, further comprising a local wiring line made of a same wiring line as said image data line, said local wiring line interconnecting the one of said first and second electrodes of said supplemental capacitor and said pixel transistor.

19. A display device comprising:
  an insulating substrate having a display area and a peripheral circuit area;
  a plurality of scanning lines formed in said display area along a row direction;
  a plurality of image data lines formed in said display area along a column direction, said image data lines defining a plurality of pixel areas together with said scanning lines;
  a pixel transistor island semiconductor layer formed in said display area near at each cross point between said scanning line and said image data line, and a plurality of peripheral circuit transistor island semiconductor layers formed in said peripheral circuit area;
  a gate insulating film for a pixel, having a first thickness and covering a middle position of each of said pixel transistor island semiconductor layers;
  a first gate electrode made of a first wiring line disposed on said first gate insulating film for a pixel above and overlapping said pixel transistor island semiconductor layers;
  a gate insulating film for a peripheral circuit, having a second thickness thinner than said first thickness and covering a middle position of each of part of said peripheral circuit transistor island semiconductor layers;
  a second gate electrode made of a second wiring line and disposed on said gate insulating film for a peripheral circuit; and
  a pixel electrode connected to said pixel transistor island semiconductor layer,
  wherein said pixel transistor island semiconductor layer, said gate insulating film for a pixel and said first gate electrode constitute a pixel transistor, and said scanning line includes a lower scanning wiring line made of said second wiring line and an upper scanning wiring line made of said first wiring line, formed above said lower scanning wiring line and extending across at least one of said plurality of image data lines, said upper scanning wiring line being connected to said lower scanning wiring line,
  wherein said gate insulating film for a pixel includes a lower first gate insulating film made of a same layer as said gate insulating film for a peripheral circuit and an upper gate insulating film formed on said lower first gate insulating film, and
  wherein an intermediate insulating layer made of a same layer as said upper second gate insulating film is disposed covering said lower scanning wiring line, an intermediate contact hole is formed through said intermediate insulating layer, and said upper scanning wiring line is formed on said intermediate insulating layer, and connected to said lower scanning wiring line via said intermediate contact hole.

20. The display device according to claim 19, further comprising a liquid crystal layer disposed above said pixel electrode, and an opposing substrate opposing to said insulating substrate and sandwiching said liquid crystal layer therebetween.

21. The display device according to claim 19, further comprising an organic EL structure formed above said pixel electrode.

22. A method of manufacturing a display device active matrix substrate, comprising the steps of:
  forming a semiconductor layer on an insulating substrate having a display area and a peripheral circuit area;
  patterning said semiconductor layer into a plurality of island semiconductor layers;
  forming a first gate insulating film covering said island semiconductor layers;
  forming a first wiring layer covering said first gate insulating film above and overlapping said island semiconductor layers;
  patterning said first wiring layer to form gate electrodes of some transistors in said peripheral circuit area and lower scanning lines in said display area;
  forming a second gate insulating film on said first gate insulating film;
  etching said second gate insulating film to form contact holes exposing the lower scanning lines in said display area;
  forming a second wiring layer on said second gate insulating film; and
  patterning said second wiring layer to form gate electrodes of pixel transistors in said display area and of some other transistors in said peripheral circuit area, and upper scanning lines extending across a data bus line, and being connected to said lower scanning lines,
  wherein said first gate insulating film includes a lower gate insulating film made of a same layer as said second gate insulating film and an upper gate insulating film formed on said lower gate insulating film, and
  wherein an intermediate insulating layer made of a same layer as said upper gate insulating film is disposed covering said lower scanning wiring line, an intermediate contact hole is formed through said intermediate insulating layer, and said upper scanning wiring line is formed on said intermediate insulating layer, and connected to said lower scanning wiring line via said intermediate contact hole.

23. The method of manufacturing a display device active matrix substrate according to claim 22, wherein said display area includes pixel areas disposed in a matrix shape, a pixel transistor island semiconductor layer formed in each pixel area, and a supplemental capacitor formed in each pixel area.

24. The method of manufacturing a display device active matrix substrate according to claim 23, further comprising the steps of:
  forming an interlayer insulating film;
  forming a contact hole reaching at least one electrode of said supplemental capacitor; and
  forming a third wiring layer covering said contact hole.

25. The method of manufacturing a display device active matrix substrate according to claim 24, wherein a supplemental capacitor island semiconductor layer is formed in each pixel area, said first wiring layer is patterned above said supplemental capacitor semiconductor layer to form a lower electrode, a contact hole is formed through said second gate insulating film to expose said lower electrode, and said second wiring layer is patterned to form an upper electrode to be connected to said lower electrode.

26. The method of manufacturing a display device active matrix substrate according to claim 24, wherein said first wiring layer is patterned to form one electrode of said supplemental capacitor, and said second wiring layer is patterned to form the other electrode of said supplemental capacitor above the one electrode of said supplemental capacitor.

27. A method of manufacturing a display device active matrix substrate, comprising the steps of:

forming island semiconductor layers of transistors on an insulating substrate having a display area and a peripheral circuit area;

stacking a first gate insulating film and a first wiring layer, said first gate insulating film covering said island semiconductor layers, and said first wiring layer being disposed on said first gate insulating film above and overlapping said island semiconductor layers;

patterning said first wiring layer to form gate electrodes of some transistors in said peripheral circuit area and lower scanning lines each having a projection region projecting sideward from an extension direction in said display area;

stacking a second gate insulating film and a second wiring layer on said first gate insulating film, said second gate insulating film covering said first gate electrodes and said lower scanning lines;

patterning said second wiring layer to form gate electrodes of pixel transistors and some other transistors in said peripheral circuit area, and upper scanning lines each extending across a data bus line and having a projection region projecting sideward from an elongated direction, respectively in said display area;

doping impurities into the island semiconductor layer on both sides of each of said gate electrodes to form source/drain regions to constitute a transistor;

forming an interlayer insulating film above said second gate insulating film, said interlayer insulating film covering said transistors and upper scanning lines;

forming contact holes through said interlayer insulating film to expose the source/drain regions of said transistors and said projection regions of said upper and lower scanning lines; and forming conductive patterns burying said contact holes and extending on said interlayer insulating film, said conductive patterns including a local wiring line for interconnecting said upper and lower scanning lines, wherein said first gate insulating film includes a lower gate insulating film made of a same layer as said second gate insulating film and an upper gate insulating film formed on said lower gate insulating film, and wherein an intermediate insulating layer made of a same layer as said upper gate insulating film is disposed covering said lower scanning wiring line, an intermediate contact hole is formed through said intermediate insulating layer, and said upper scanning wiring line is formed on said intermediate insulating layer, and connected to said lower scanning wiring line via said intermediate contact hole.

28. A method of manufacturing a display device active matrix substrate, comprising the steps of:

forming island semiconductor layers of transistors on an insulating substrate having a display area and a peripheral circuit area;

stacking a first gate insulating film and a first wiring layer, said first gate insulating film covering said island semiconductor layers, and said first wiring layer being disposed on said first gate insulating film above and overlapping said island semiconductor layers;

patterning said first wiring layer to form gate electrodes of some transistors in said peripheral circuit area and lower scanning lines each having a lower contact region and extending in a row direction;

stacking a second gate insulating film and a second wiring layer on said first gate insulating film, said second gate insulating film covering said first gate electrodes and said lower scanning lines;

patterning said second wiring layer to form gate electrodes of pixel transistors and some other transistors in said peripheral circuit area, and upper scanning lines above said lower scanning lines and extending across a data bus line, said upper scanning line having an opening above said lower contact region and has an upper contact region near and above said lower contact region;

doping impurities into the island semiconductor layer on both sides of each of said gate electrodes to form source/drain regions to constitute a transistor;

forming an interlayer insulating film above said second gate insulating film, said interlayer insulating film covering said transistors and upper scanning lines;

forming contact holes through said interlayer insulating film to expose the source/drain regions of said transistors and said upper and lower contact regions of said upper and lower scanning lines; and forming conductive patterns burying said contact holes and extending on said interlayer insulating film, said conductive patterns including a local wiring line for interconnecting said upper and lower scanning lines, wherein said first gate insulating film includes a lower gate insulating film made of a same layer as said second gate insulating film and an upper gate insulating film formed on said lower gate insulating film, and wherein an intermediate insulating layer made of a same layer as said upper gate insulating film is disposed covering said lower scanning wiring line, an intermediate contact hole is formed through said intermediate insulating layer, and said upper scanning wiring line is formed on said intermediate insulating layer, and connected to said lower scanning wiring line via said intermediate contact hole.

29. The display device active matrix substrate according to claim 1, wherein the lower scanning wiring line is formed all along the upper scanning wiring line.

30. The display device active matrix substrate according to claim 1, wherein the lower wiring scanning line and the upper scanning wiring line are connected to each other in the pixel.

31. The display device active matrix substrate according to claim 19, wherein the lower scanning wiring line is formed all along the upper scanning wiring line.

32. The display device active matrix substrate according to claim 19, wherein the lower wiring scanning line and the upper scanning wiring line are connected to each other in the pixel.

33. The method for manufacturing a display device active matrix substrate according to claim 22, wherein the lower scanning wiring line is formed all along the upper scanning wiring line.

34. The method for manufacturing a display device active matrix substrate according to claim 22, wherein the lower wiring scanning line and the upper scanning wiring line are connected to each other in the pixel.

35. The method for manufacturing a display device active matrix substrate according to claim 27, wherein the lower scanning wiring line is formed all along the upper scanning wiring line.

36. The method for manufacturing a display device active matrix substrate according to claim 27, wherein the lower wiring scanning line and the upper scanning wiring line are connected to each other in the pixel.

37. The method for manufacturing a display device active matrix substrate according to claim 28, wherein the lower scanning wiring line is formed all along the upper scanning wiring line.

38. The method for manufacturing a display device active matrix substrate according to claim 28, wherein the lower wiring scanning line and the upper scanning wiring line are connected to each other in the pixel.

* * * * *